(12) United States Patent
Thiebeauld De La Crouee

(10) Patent No.: US 10,243,729 B2
(45) Date of Patent: *Mar. 26, 2019

(54) METHOD OF TESTING THE RESISTANCE OF A CIRCUIT TO A SIDE CHANNEL ANALYSIS

(71) Applicant: ESHARD, Martillac (FR)

(72) Inventor: Hugues Thiebeauld De La Crouee, Pessac (FR)

(73) Assignee: ESHARD, Martillac (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,530

(22) Filed: Feb. 22, 2017

(65) Prior Publication Data

US 2017/0244547 A1 Aug. 24, 2017

(30) Foreign Application Priority Data

Feb. 22, 2016 (FR) ..................................... 16 51443
Feb. 22, 2016 (FR) ..................................... 16 51444
Feb. 22, 2016 (FR) ..................................... 16 51445

(51) Int. Cl.
*G06F 11/30* (2006.01)
*G06F 12/14* (2006.01)
(Continued)

(52) U.S. Cl.
CPC ........ *H04L 9/003* (2013.01); *G01R 31/31719* (2013.01); *G06F 21/72* (2013.01);
(Continued)

(58) Field of Classification Search
None
See application file for complete search history.

(56) References Cited

U.S. PATENT DOCUMENTS

2002/0107654 A1* 8/2002 Mori .................. G01R 19/2509
702/120
2003/0223580 A1 12/2003 Snell
(Continued)

FOREIGN PATENT DOCUMENTS

EP 1267514 A2 12/2002
EP 3226460 A1 * 10/2017 ............... G09C 1/00
(Continued)

OTHER PUBLICATIONS

Benedikt Gierlichs, Lejla Batina, Pim Tuyls, Mutual Information Analysis: A Universal Differential Side-Channel Attack, 2007, Philips Research, K.U. Leuven, ESAT/SCD—COSIC, pp. 1-2 and 9-10.*

(Continued)

*Primary Examiner* — Kambiz Zand
*Assistant Examiner* — Arezoo Sherkat
(74) *Attorney, Agent, or Firm* — Brake Hughes Bellerman LLP

(57) ABSTRACT

In a general aspect, a test method can include acquiring a plurality of value sets, each including values of a physical quantity or of logic signals, linked to the activity of a circuit to be tested when executing distinct cryptographic operations applied to a same secret data, for each value set, counting occurrence numbers of the values of the set, for each operation and each of the possible values of a part of the secret data, computing a partial result of operation, computing sums of occurrence numbers, each sum being obtained by adding the occurrence numbers corresponding to the operations which when applied to a same possible value of the part of the secret data, provide a partial operation result having a same value, and analyzing the sums of occurrence numbers to determine the part of the secret data.

25 Claims, 10 Drawing Sheets

(51) Int. Cl.
*H04L 9/00* (2006.01)
*G01R 31/317* (2006.01)
*G09C 1/00* (2006.01)
*G06F 21/72* (2013.01)
*H04L 9/32* (2006.01)
*G06F 21/75* (2013.01)

(52) U.S. Cl.
CPC .............. *G09C 1/00* (2013.01); *H04L 9/002* (2013.01); *H04L 9/3242* (2013.01); *H04L 9/3247* (2013.01); *H04L 9/3249* (2013.01); *H04L 9/3252* (2013.01); *G06F 21/75* (2013.01); *H04L 2209/08* (2013.01); *H04L 2209/12* (2013.01)

(56) References Cited

U.S. PATENT DOCUMENTS

| | | | |
|---|---|---|---|
| 2006/0167639 A1* | 7/2006 | Mori | G01R 31/3004 702/59 |
| 2006/0242463 A1* | 10/2006 | Yasui | G01R 31/3004 714/22 |
| 2007/0219735 A1* | 9/2007 | Saeki | G06F 17/5022 702/80 |
| 2008/0019503 A1 | 1/2008 | Dupaquis et al. | |
| 2009/0074181 A1* | 3/2009 | Pelletier | H04L 9/003 380/29 |
| 2011/0246119 A1 | 10/2011 | Feix et al. | |
| 2013/0182839 A1* | 7/2013 | Vuillaume | G06F 7/582 380/44 |
| 2014/0201851 A1* | 7/2014 | Guo | H04L 9/0866 726/34 |
| 2015/0317475 A1 | 11/2015 | Aguayo Gonzalez et al. | |
| 2016/0140340 A1* | 5/2016 | Walters | G06F 21/556 726/22 |
| 2016/0239647 A1* | 8/2016 | Johnson | G06F 21/14 |

FOREIGN PATENT DOCUMENTS

| | | | | |
|---|---|---|---|---|
| FR | 2873523 A1 | 1/2006 | | |
| FR | 2893796 A1 | 5/2007 | | |
| WO | WO-2016083864 A1 * | 6/2016 | ............ | H04L 9/002 |

OTHER PUBLICATIONS

French Search Report from FR1651443, dated Oct. 12, 2016, 2 pages.
French Search Report from FR 1651444, dated Oct. 26, 2016, 2 pages.
French Search Report from FR1651445, dated Nov. 24, 2016, 2 pages.
Agoyan, et al., Design and characterisation of an AES chip embedding countermeasures, HAL archives-ouvertes.fr (http://hal-emse.ccsd.cnrs.fr/emse-0062440) ,Mar. 16, 2015, 22 pages.
Allibert, et al., Chicken or the Egg Computational Data Attacks or Physical Attacks, International Association for Cryptologic Research, Nov. 10, 2015, vol. 20151110: 103835, XP061019629, 26 pages.
Bouesse, et al.,Path Swapping Method to Improve DPA Resistance of Quasi Delay Insensitive Asynchronous Circuits, Cryptographic Hardware and Embedded Systems—CHES 2006 Lecture Notes in Computer Science, Oct. 10, 2006, 384-398.
Feix, et al., "Defeating ISO9797-1 MAC Algo 3 by Combining Side-Channel and Brute Force Techniques", International Association for Cryptologic Research, Dept. 5, 2014, vol. 20140905:191135, XP061016892, 15 pages.
Joye, et al.,Strengthening hardware AED implementations against fault attacks, IET Inf. Secur. vol. 1(3), Sep. 10, 2007, 106-110.
European Search Report for International Application 17156286.1, dated Aug. 22, 2017, 5 pages.
European Search Report for International Application 17156287.9, dated Jul. 26, 2017, 7 pages.
European Search Report for International Application 17156290.3, dated Aug. 22, 2017. 4 pages.
European Search Report for International Application 17156292.9, dated Aug. 17, 2017, 4 pages.
European Search Report for International Application 17156293.7, dated Aug. 23, 2017, 4 pages.
Prouff, Emmanuel , et al., "Statistical Analysis of Second Order Differential Power Analysis", Prouff et al.; "Statistical Analysis of Second Order Differential Power Analysis"; IEEE Transactions on Computers, vol. 58, No. 6, Jun. 1, 2009, XP011250050, pp. 799-811., pp. 799-811.
Waddle, Jason , et al., "Towards Efficient Second-Order Power Analysis", Waddle et al.; "Towards Efficient Second-Order Power Analysis"; Cryptographic Hardware and Embedded Systems—CHES 2004; Springer-Verlag, Berlin/Heidelberg; Jul. 8, 2004; XP019009359; pp. 1-15., pp. 1-15.

* cited by examiner

METHOD OF TESTING THE RESISTANCE OF A CIRCUIT TO A SIDE CHANNEL ANALYSIS

CROSS REFERENCE TO RELATED APPLICATIONS

This application claims priority to French Application Numbers FR1651443, FR1651444 and FR1651445, filed Feb. 22, 2016, the disclosures of which are incorporated herein by reference.

TECHNICAL FIELD

The present disclosure relates to methods for testing a circuit, in particular a circuit designed to handle a secret data, and in particular a circuit for transforming a message by an encryption algorithm using a secret key.

The present disclosure also relates to devices implementing cryptographic algorithms, such as secure devices (smart card integrated circuits, secure elements, secured memory cards), mobile devices (mobile phones, smartphones, Internet of Things), home automation and automotive devices, and to hardware cryptographic components integrated onto mother boards of computers and other electronic and IT equipment (USB drives, TV decoders, game consoles, etc.), or the like. The present disclosure also relates to software including an encryption operation, provided for being executed in a secure or non-secured environment.

The present disclosure also relates to circuits implementing a cryptographic algorithm such as a ciphering algorithm like DES (Data Encryption Standard) or Triple DES, AES (Advanced Encryption Standard), RSA (Rivest, Shamir and Adleman), DSA (Digital Signature Algorithm), or ECDSA (Elliptic Curve Digital Signature Algorithm). The present disclosure also relates to circuits implementing a hashing function such as HMAC (Keyed-Hash Message Authentication Code).

BACKGROUND

Microcircuits implementing a cryptographic algorithm are equipped with a central processing unit (CPU). Some are equipped with circuits dedicated to cryptographic computing, for example a cryptographic coprocessor. These microcircuits include thousands of logic gates that switch differently according to the operations executed. These switches create short variations in current consumption, for example of a few nanoseconds that can be measured. In particular, CMOS-type integrated circuits include logic gates that only consume current when they switch, i.e. when a logic node changes to 1 or to 0. Therefore, the current consumption depends on the data handled by the central unit and on its various peripherals: memory, data flowing on the data or address bus, cryptographic coprocessor, etc.

Furthermore, certain software programs, produced in particular using encryption or obfuscation techniques, such as the "Whitebox Cryptography" technique, may integrate a secret data in such a way that it is very difficult to determine it by reverse engineering. Certain software programs may also receive a secret data from outside through a secure communication channel. Such microcircuits may be subjected to so-called side channel analysis attacks based on observing their current consumption, or their magnetic or electromagnetic radiation, or any other information that can be observed while a cryptographic algorithm is executed. Such attacks aim to discover the secret data they use, in particular their encryption keys. Frequent side channel attacks implement statistical analysis methods such as SPA ("Single Power Analysis"), DPA ("Differential Power Analysis"), CPA ("Correlation Power Analysis") or EMA ("ElectroMagnetic Analysis"). SPA analysis normally only requires the acquisition of a single current consumption trace. It aims to obtain information about the activity of the integrated circuit by observing the part of the consumption trace corresponding to a cryptographic computation, since the current trace varies according to the operations executed and the data handled.

Software may also undergo such side channel attacks during their execution by a circuit.

DPA and CPA analyses enable the key of an encryption algorithm to be found by acquiring numerous data or measurement traces and by statistically analyzing these traces to find the information searched for. They are based on the assumption that the consumption of a CMOS-type integrated circuit varies when a bit changes from 0 to 1 in a register or on a bus, and does not vary when a bit remains equal to 0, remains equal to 1 or changes from 1 to 0 (discharge of the stray capacitance of the MOS transistor). Alternatively, it can be considered that the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used to develop a consumption model that does not require the structure of the integrated circuit to be known to be applicable. DPA analysis involves amplifying this consumption difference using statistical processing on numerous consumption traces, aiming to highlight a measurement difference between two families of consumption traces distinguished according to formulated hypotheses.

CPA analysis is based on a linear current consumption model and involves computing a correlation coefficient between, firstly, the consumption points measured that form the captured consumption traces and, secondly, an estimated consumption value, computed from the linear consumption model and a hypothesis on the variable to be discovered that is handled by the microcircuit and on the value of the encryption key.

Electromagnetic analysis (EMA) is based on the principle that a microcircuit may leak information in the form of near or far field electromagnetic radiation. Given that transistors emit electromagnetic signals when their state changes, these signals can be treated like the current consumption variation signals by an analysis such as one or other of the SPA, DPA and CPA analyses.

Other side channel attacks exist, such as "Template attacks" and "Mutual Information Analysis" (MIA). In other instances an attack can include combining side channel technique and a reasonable brute force effort. All of the above-mentioned attacks are based on a time alignment of all the analyzed traces. In other words, all the measurements performed at a given time, for example from the time the execution of a command is activated by the circuit, must correspond to the same value handled by the algorithm.

To protect such circuits and the cryptographic algorithms they execute against such side channel attacks, countermeasures are generally provided. One type of countermeasure aims to avoid such a time alignment. For this purpose, these type of counter-measures introduce variations in the clock frequency supplied to the calculation circuits, or introduce dummy clock cycles or dummy operations. Another type of counter-measure involves adapting a given algorithm to be protected to render the data handled by the circuit independent of their actual values. Certain counter-measures of this type—that can be referred to as "masking-type counter-measures"—use a random mask (binary number) that is combined with another data to be protected such as the key and/or the message during the execution of the ciphering method. This type of counter-measure is effective but requires the algorithm to be modified, and thus requires a coprocessor specially provided for its implementation in the case of execution by a dedicated coprocessor, or a more complex program in the case of execution by the central processing unit of the microcircuit or a programmed coprocessor.

A counter-measure by multiple executions can be implemented with a conventional coprocessor that does not implement any specific counter-measures. It merely involves executing the ciphering method several times by means of false keys or false messages. For this purpose, a counter-measure program is provided for example that controls the ciphering program or the coprocessor, and makes it execute the ciphering method several times with the false keys, in a random order, such that the execution of the ciphering method with the right key (i.e. the authentic key) is "hidden" in a set of dummy executions. This counter-measure, by multiple executions, offers the advantage that it can be implemented with a conventional coprocessor not including any specific counter-measure means.

It is sometimes possible to restore this time alignment, by means of specific expertise and many attempts, in particular using a high number of traces to be realigned or applying some signal processing. Despite the foregoing, cases remain where it is not possible to restore this time alignment, such that the side channel tests fail even though there is a secret data leakage present in the traces.

To check the level of security offered by a secure integrated circuit intended to be marketed, qualification and/or certification tests are planned before the circuit is marketed, where these tests can include tests of the robustness of the integrated circuit to side channel analyses aiming to discover the secret data handled by the integrated circuit. There are also tests enabling the resistance of a software program to side channel attacks to be assessed.

SUMMARY

Some embodiments relate to a test method including: acquiring a plurality of value sets, each value set including values of a physical quantity or of logic signals, linked to the activity of a circuit to be tested when the circuit executes an operation of an operation set of distinct cryptographic operations applied to a same data to be discovered, for each value set, counting by a processing unit occurrence numbers of values transformed by a first surjective function applied to values of the value set, to form an occurrence number set for the value set, for each operation of the operation set, and each of the possible values of a part of the data to be discovered, computing by the processing unit a partial operation result, computing by the processing unit cumulative occurrence number sets, each cumulative occurrence number set being obtained by adding the occurrence number sets corresponding to the operations of the operation set, which when applied to a same value or equivalent value of the possible values of the part of the data to be discovered, provide a partial operation result having a same transformed value resulting from the application of a second surjective function, and analyzing by the processing unit the cumulative occurrence number sets to determine the part of the data to be discovered, knowing that if the data to be discovered has leaked into the value sets, it is found in the cumulative occurrence number sets corresponding to the value of the part of the data to be discovered.

According to one embodiment, the method can include selecting values in each value set, the counting of occurrence numbers being performed on the selected values.

According to one embodiment, the method can include transmitting to the circuit a plurality of distinct commands, each command triggering the execution by the circuit of one of the operations of the operation set, applied to the data to be discovered, and during the execution by the circuit of one operation of the operation set, collecting by a measuring device, the values of one of the value sets.

According to one embodiment, the value sets can include: measurements of current consumption of the circuit, and/or measurements of electromagnetic radiation emitted by the circuit, and/or measurements of absorption of magnetic field present around the circuit, and/or logic signals or digital values collected in the circuit.

According to one embodiment, each of the first and second surjective functions can be one of the following functions: an identity function, a function providing a resultant value which is then reduced to a value corresponding to a Hamming weight, a function providing the Hamming weight of the value to which the function is applied, or a function providing a Hamming distance between a value and a preceding value to which the function is applied.

According to one embodiment, the method can include rejecting the circuit or the program executed by the circuit if the analyzing step determines the part of the data to be discovered.

According to one embodiment, computing an operation result for each of the possible values of a part of the data to be discovered, of computing the cumulative occurrence number sets, and analyzing the cumulative occurrence number sets can be performed for a previously determined part of the data to be discovered and another part of the data to be discovered.

According to one embodiment, the selected values in each value set can include: consecutive values of the value set, and/or non-consecutive values of the value set, and/or local extremum values of the value set, and/or all the values of the value set.

According to one embodiment, the operations of the operation set can include applying a single operation to the data to be discovered and to an input data of a set of input data, the single operation including at least one of the following operations: a symmetrical or asymmetrical encryption or decryption operation, a signature operation, a modular or non-modular multiplication by the data to be discovered, a logic Exclusive OR operation with the data to be discovered, a modular exponentiation operation, the data to be discovered being used as exponent, a modular reduction operation, the data to be discovered being used as modulus, a substitution operation by a value selected in a substitution table using the input value, and an operation combining a logic Exclusive OR operation with the data to be discovered and a substitution operation replacing the result of the logic operation with a value selected in a substitution table using the result of the logic operation.

According to one embodiment, the analysis of the cumulative occurrence number sets can include: for each cumulative occurrence number set, computing a normalized cumulative occurrence number set by dividing each of the cumulative occurrence numbers of the cumulative occurrence number set by a corresponding number of occurrence numbers accumulated in the cumulative occurrence number, for each possible value of the part of the data to be discovered and each possible value of the transformed partial result, computing a sum of squared differences, between each normalized cumulative occurrence number corresponding to the possible value of the part of the data to be discovered and the possible value of the transformed partial result, and an average value of the cumulative occurrence numbers, divided by a number of operations, for each possible value of the part of the data to be discovered, computing a cumulative total of difference sums corresponding to the possible values of the transformed partial results, and comparing with each other the cumulative totals of difference sums, and detecting whether one of the cumulative totals of difference sums for a possible value of the part of the data to be discovered is greater than the other cumulative totals of difference sums.

According to one embodiment, the analysis of the cumulative occurrence number sets can include: for each possible value of the part of the data to be discovered and each possible value of the transformed partial result, computing a cumulative total of the cumulative occurrence numbers, for each occurrence numbers, computing a normalized cumulative total by dividing the cumulative occurrence numbers by the corresponding cumulative total, and computing the product of the normalized cumulative total by the logarithm of the normalized cumulative total, for each possible value of the part of the data to be discovered and each possible value of the transformed partial result, computing a sum of the products corresponding to the possible value of the part of the data to be discovered and the possible value of the transformed partial result, for each possible value of the part of the data to be discovered, computing a cumulative total of the product sums corresponding to the possible values of the transformed partial results, each product sum being multiplied by a corresponding number of cumulative occurrence numbers, and comparing with each other the cumulative totals of product sums, and detecting whether one of the cumulative totals of product sums for a possible value of the part of the data to be discovered is greater than the other cumulative totals of product sums.

Some embodiments may also relate to a system for testing a circuit, the system including: a measuring device configured to acquire a plurality of value sets, each value set including values of a physical quantity or of logic signals, linked to the activity of a circuit to be tested during the execution by the circuit of an operation of an operation set of distinct cryptographic operations applied to a same data to be discovered, and a processing unit configured to implement the methods defined above.

According to one embodiment, the system can include a measuring probe coupled to the measuring device for acquiring traces linked to the activity of the circuit.

According to one embodiment, the system can include an emulator executing an application to be tested.

Some embodiments may also relate to a computer program product loadable into an internal memory of a computer and including code portions which, when executed by a computer configure, the computer to carry out the methods defined above.

BRIEF DESCRIPTION OF THE DRAWINGS

Examples of embodiments are provided herein for illustration purposes, and are described below in relation with, but not limited to, the accompanying figures, in which.

DETAILED DESCRIPTION

In view of the drawbacks of current approaches noted above, it may be desirable to have an approach for testing the resistance of a circuit or software program to a side channel analysis, that can in particular detect a secret data leakage without requiring any prior time alignment processing of current consumption traces or of any other physical or logic quantity representative of the circuit's activity. It may also be desirable for this approach to be able to test the robustness of a software program or an application, independently of the circuit in which it is executed.

It may also be desirable for such testing approaches to be integrated into an industrial qualification and/or certification process aiming to check the robustness of circuits or software executed by a given circuit, to side channel analyses and their susceptibility to information leakage.

It may also be desirable to propose counter-measure means enabling an integrated circuit or a software program to be considered capable of being used in a product, after a qualification and/or certification process including such a test method.

Figure 1:
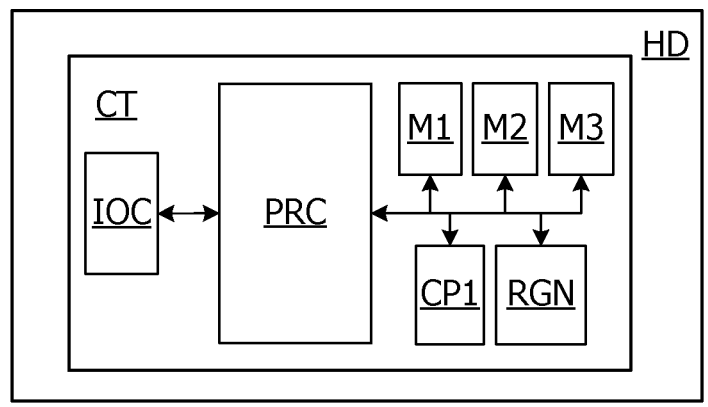
FIG. 1 schematically illustrates a conventional architecture of a secure circuit, FIG. 2 schematically illustrates an example of an integrated circuit testing system.

FIG. 1 illustrates, as an example, a secure integrated circuit CT, for example arranged on a portable medium HD such as a plastic card or any other medium, or in a terminal such as a mobile terminal, a smartphone, an IoT device or the like. The integrated circuit of this example includes a microprocessor PRC, an input/output circuit IOC, memories M1, M2, M3 coupled to the microprocessor by a data and address bus and, optionally, a cryptographic computation coprocessor CP1 or arithmetic accelerator, and a random number generator RGN. The memory M1 is a RAM-type ("Random Access Memory") memory containing volatile application data. The memory M2 is a non-volatile memory, for example an EEPROM or Flash memory, containing non-volatile data and application programs. The memory M3 is a read-only memory (or ROM memory) containing the operating system of the microprocessor.

The communication interface circuit IOC may be of contact type, for example according to the ISO/IEC 7816 standard, of contactless type with inductive coupling, for example according to the ISO/IEC 14443A/B or ISO/IEC 13693 standard, of contactless type by electrical coupling (UHF interface circuit), or of both contact and contactless type. The interface circuit IOC may also be coupled through a specific interface, to another circuit such as an NFC (Near-Field Communications) controller, or a main circuit of a terminal such as a mobile terminal or a connected object.

In some embodiments, the integrated circuit CT may be configured to execute operations of ciphering, deciphering or signing of messages that are sent to it, by means of an encryption function. This encryption function may be executed by the processor PRC of the circuit CT or partially or totally carried out by the processor PRC to the coprocessor CP1.

Figure 2:
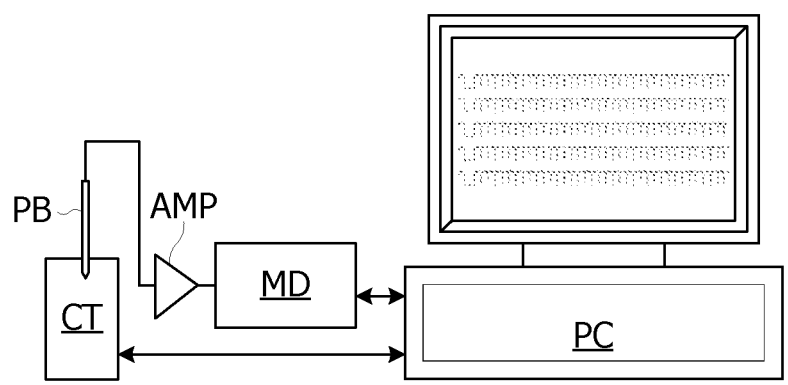

FIG. 2 illustrates an example of an integrated circuit testing system provided to implement the test method, according to one embodiment. It will be assumed, as an example, that the testing system is configured to test the integrated circuit CT in FIG. 1.

The testing system of FIG. 2 includes a measuring probe PB coupled to a measuring device MD such as a digital oscilloscope, to acquire traces related to the activity of the circuit, such as traces of current consumption or of electromagnetic signal variation, and a computing device, such as a personal computer PC. The computer PC is coupled to the measuring device and implements a test program. This test program includes a communication interface and a program for communicating with the integrated circuit and for sending it messages, a signal processing program and a program for implementing computation steps of a method, such as the methods described herein. Steps, as used herein, can refer to operations, functions, processes, etc. In the event that the integrated circuit is a contactless circuit, the communication interface may include a contactless card reader.

The probe PB may be a current probe (for example, a resistor placed on the supply terminal Vcc of the integrated circuit), or an electromagnetic probe coupled to the measuring device by a signal amplifier AMP. Alternatively, a current probe may be combined with an electromagnetic probe. The study of electromagnetic radiation indeed shows that an electromagnetic field emitted by a circuit in operation gives information about bit switches in the integrated circuit, just like the measurement of the consumed current. The advantage of an electromagnetic probe is that it may be placed near the part of the circuit whose operation needs to be analyzed (for example near the core of the microprocessor PRC or of the cryptographic computation coprocessor CP1).

Furthermore, in the case of a contactless integrated circuit, the current probe can be replaced with an inductive probe that measures the absorption, by the integrated circuit, of the magnetic field emitted by the reader. Such an inductive probe, for example an antenna coil, can itself be combined with an electromagnetic field probe placed near the circuit zones to be studied.

Therefore, in the present application, the phrase "current consumption", used for the sake of simplifying the language, can refer to any measurable physical quantity of which the variations over time are representative of the switches of binary data inside the integrated circuit or inside the studied part of the integrated circuit, the physical quantity being able to be measured at the terminals of the integrated circuit or near the studied part of the integrated circuit. Furthermore, the physical quantity is sampled with a sampling frequency sufficiently high to collect several points per data period of interest, which, in practice, can result in traces containing from 10 to a few hundred thousand points per trace, but it may be considered to collect up to several million values, or even more per trace.

The present disclosure also relates to a method for testing a software program or an application. In this case, the software program may be executed directly by the testing system or by an emulation program executed by the testing system. The analyzed traces may thus, for example, be a series of values transmitted to a memory when accessing a memory or data handled in registers of the circuit, or can be data transmitted to a communication interface of the circuit, where these transmissions can be controlled by the tested software program.

Test Method

Some embodiments of a test method can be based on a detailed review of traces of variation over time of signals or digital values, representative of the operation of the circuit to be tested while it executes an operation applied to a data to be discovered, called in the following "secret data".

Figure 3:
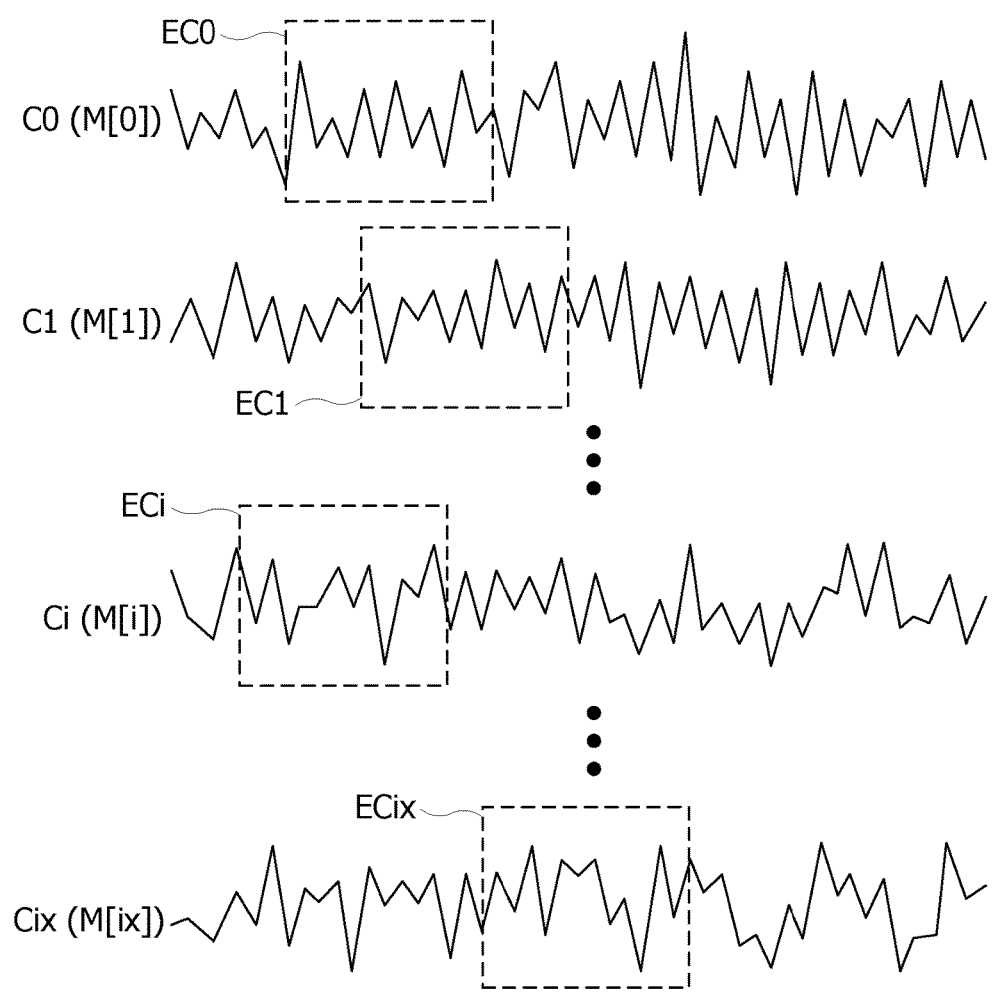
FIG. 3 illustrates traces of a signal acquired during the execution of an encryption operation by a secure circuit.

FIG. 3 illustrates traces C0, C1, . . . Cix of values over time that can be acquired by a testing system. Each of these traces can be obtained by causing an operation to be executed by the circuit or the software program to be tested. The operations corresponding to the traces C0, C1, . . . Cix are generally all different. These operations are different for example because they involve applying a same function to distinct known input data, for example messages to be ciphered, deciphered or signed or a signature to be checked, or a HMAC (keyed-Hash Message Authentication Code) to be computed. Alternatively, the known data may be output data of the function, or a part of the input and output data of this function, rather than input data thereof.

The function may be any function applied to a same secret data SD, and to an input data M, such as a symmetrical or asymmetrical ciphering or deciphering operation, or even a signature operation, or merely a modular or non-modular multiplication, by the secret data (M×SD), a logic XOR function (Exclusive OR) with the secret data (M XOR SD), a modular exponentiation function, the secret data being used as exponent (MSD mod n, n being known), or a modular reduction function, the secret data being used as the modulus (M mod SD). Another example of a function involves processing the result of an XOR operation with a substitution table (SBOX[M XOR SD], SBOX being the substitution table), as in the case of the DES and AES cryptographic algorithms. More generally, this function must enable a part of the value resulting from the operation to be computed based on a part of the secret data and an input data.

In the example of FIG. 3, the traces C0, 01, Ci, Cix respectively correspond to the input (or output) data M[0], M[1], . . . M[i], . . . M[ix]. Each of the traces Ci can be formed of samples acquired from a same signal measured on a same circuit under test, or can include samples from different signals, captured when the circuit under test manipulates the data M[i].

Figure 4:
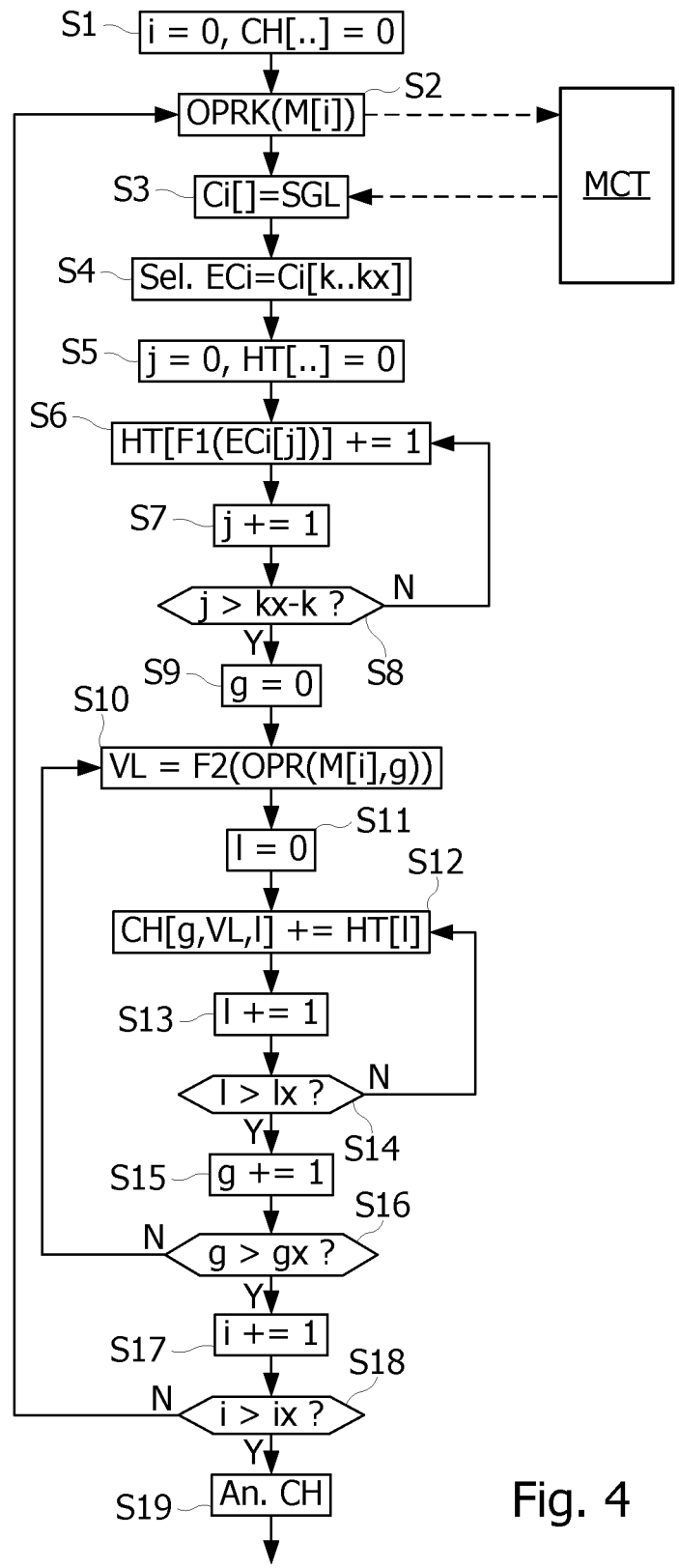
FIG. 4 illustrates a method for testing a secure circuit, according to one embodiment.

FIG. 4 illustrates steps (operations, functions, processes, etc.) S1 to S19 of processing the values collected by a testing system during the execution of an encryption operation OPRK assumed to be known, applied to a secret data to be discovered, and to input data M[0] . . . M[ix] also known. According to one embodiment, the aim of this test is to determine whether the value of the secret data leaks into (e.g., can be determined from) the collected values forming the traces of FIG. 3, for example. The processing unit PC first executes steps S1 to S8.

In step S1, the processing unit PC of the testing system sets an index i of a loop on the input data M[0] . . . M[ix] to 0, as well as a table CH. In step S2, the processing unit PC activates the execution of an operation OPRK by the circuit MCT or the software program to be tested, this operation receiving the data M[i], the secret data being provided to the operation by the circuit MCT or the software program. In step S3, the processing unit PC collects the values constituting the trace Ci. In step S4, a part ECi of the values of the trace Ci is selected, with only this part being processed in the following processing steps (FIG. 3). In the example in FIG. 4, this part is delimited by the values of the trace Ci corresponding to the indices k and kx, for the sake of simplicity. In reality, the indices k and kx may vary from one trace Ci to the next. In addition, the values thus selected in each trace are not necessarily consecutive, and the number of values in each part ECi, may be different from one trace Ci to the next, in contrast with prior side-channel analyses. Hence, it may be decided, for example, to extract only maximum or minimum local values from each trace. It is noted that the extracted part ECi may be the entire trace Ci. In the following processing, the data thus extracted are assumed to contain a piece of information concerning the secret data that is being searched for.

Figure 5:
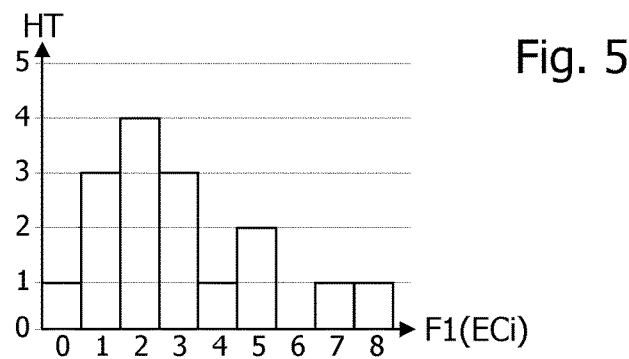
FIG. 5 illustrates, in graph form, an example of a surjective function, FIG. 6 schematically illustrates a table built according to one embodiment, to perform statistical processing.

In step S5, the processing unit PC sets a loop index j, as well as a table HT to 0. In step S6, the processing unit PC applies a surjective function F1 to the value ECi[j] of index j of the selected trace part ECi and increments by one (1) a value in the table HT, designated by an index equal to the result provided by the function F1. In step S7, the index j is incremented by one (1). In step S8, the index j is compared with its maximum value to determine whether all the values of the set ECi have been processed. Once all the values of the set ECi have been processed, the processing unit PC executes the steps S9 to S14, otherwise it executes the steps S6 to S8 again. In this way, the values of the set ECi loaded in the table HT have the form of a histogram specifying the occurrence number of each possible value returned by the function F1, such that the time feature related to the values of the set ECi is not included in the table HT: the content of the table HT does not enable the order in which the values of the set have been collected to be determined. FIG. 5 represents an example of a table HT in the form of a graph occurrence numbers (in the y axis) of values (in the x axis) computed using the function F1. In the example of FIG. 5, the function F1 returns the Hamming weight computed from 8-bit encoded values.

Figure 6:
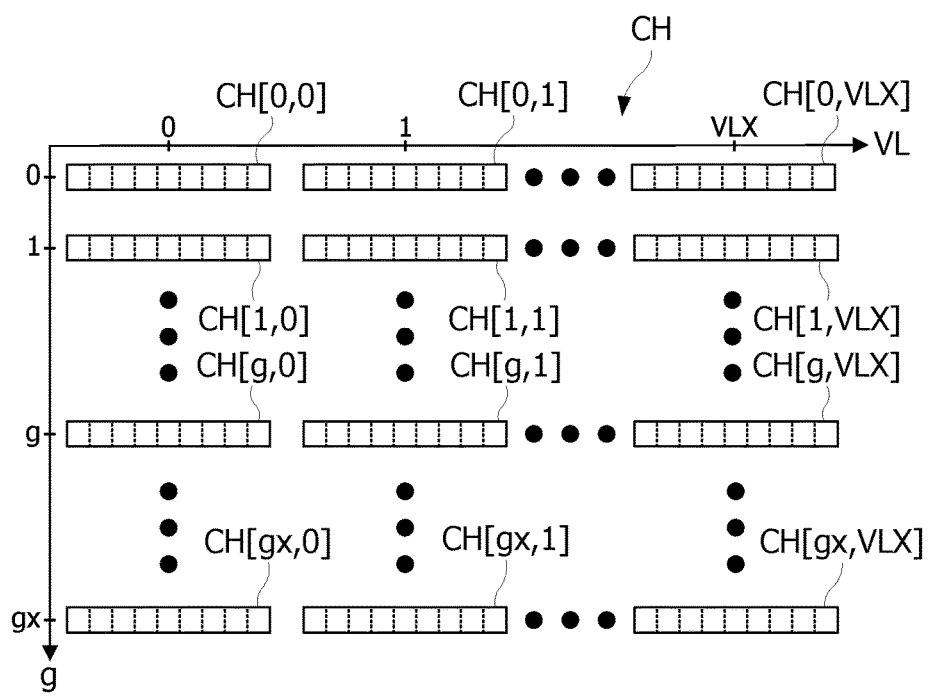

In step S9, the processing unit PC sets index g to 0. In step S10, the processing unit PC applies an operation OPR to the data M[i] and to a part of the secret data SD to be determined, set to be equal to the index g. The operation OPR(M, g) may provide a part of the result of the operation OPRK (M) (=OPR(M, SD)) executed in step S2. The result provided by the operation OPR is processed by a surjective function F2 that supplies a value VL. In step S11, the processing unit PC sets index I to 0. In step S12, the processing unit PC increments a value stored in the 3-dimensional table CH, at a location designated by the indices g, VL and I, by the value HT[I] at the index I in the table HT corresponding to the data M[i]. FIG. 6 represents an example of a table CH in which each location CH[g,VL] designated by the indices g and VL contains a table obtained by combining several tables HT according to the value VL obtained in step S11. In step S13, the index I is incremented by one (1). In step S14, the index I is compared with its maximum value Ix considering the number of possible distinct values provided by the function F1. If the index I is lower than or equal to its maximum value Ix, steps S12 to S14 are executed again, otherwise (when index I is greater than its maximum value Ix), steps S15 and S16 are executed.

In step S15, the processing unit PC increments the index g by one (1). In step S16, the processing unit PC compares the index g with its maximum value gx, considering the number of possible distinct values for the considered part of the secret data. If the index g is lower than or equal to the maximum value gx, a new iteration from S10 to S16 is executed, otherwise (when index g is greater than its maximum value gx), steps S17 and S18 are executed. In step S17, the processing unit PC increments the index i by one (1) to process another trace Ci. In step S18, the processing unit PC compares the index i with its maximum value ix corresponding to the number of traces Ci generated. If the index i is lower than or equal to the maximum value ix, steps S2 to S18 are executed again, otherwise (when index i is greater than its maximum value ix), step S19 is executed. In step S19, each table of cumulative totals contained in the table CH at the location [g,VL] contains the following values:

$$CH[g, VL, 0 \ldots Ix] = \sum_{M[i]} HT_{M[i]}[0 \ldots Ix] \quad (1)$$

the data M[i] to be taken into account in the above sum being such that $F2(OPR(M[i],g))=VL$.

In step S19, the processing unit PC performs a statistical analysis of the table CH to determine whether a value of the index g corresponds to the part of the secret data being searched for. For this purpose, it is considered that the information resulting from a leakage of the secret data have been accumulated in the locations of a row g of the table CH, whereas the information independent from the secret data is distributed randomly or uniformly in the table CH. As a result, if a row of index g of the table CH contains higher values than in the rest of this table, the value of the index g at this row of the table CH corresponds to the value of the part of the secret data SD searched for. In this case, it can be considered that the secret data SD has leaked into the collected data forming the traces Ci.

The functions F1 and F2 can be chosen so as to correspond to the leakage pattern of the circuit or the software program to be tested. Therefore, the functions F1 and F2 may be the same or different from each other, and may be chosen to maximize (increase, etc.) the probability of discovering a secret data manipulated by the circuit. For example, the functions F1 and F2 may be one of the following functions:

the identity function,
a function (e.g. in the form $F(x)=a \cdot x+b$), with a resultant value that could be reduced to a value corresponding to a Hamming weight, for example between values 0 and 8 when x is encoded on 8 bits,
a function that computes a Hamming weight of a value provided at input of the function, for example the number of bits at 1 of the binary coded value, or
a function that computes a Hamming distance with another value, for example the difference between the numbers of bits at 1 of these two values.

It is noted that the choice of the functions F1 and F2 may impact both the complexity of the statistical processing of the table CH to be performed to determine the considered part of the secret data, and the success of the statistical processing to determine the value of the part of the secret data being searched for.

The part of the secret data being searched for by executing steps S1 to S19 may, for example, be defined on 8 or 16 bits. In the case of 8 bits, the index g is successively allocated to all the values between 0 and 255 (or 1 and 256=28). It is noted that the order in which the values of g are tested is not significant for the result of the test. The part of the secret data being searched for may also be defined on wider words such as on 16, 32 or 64 bits.

Another part of the secret data SD may be determined by executing steps S9 to S19 using the values of the previously determined parts of the secret data, and by forcing another part of the secret data to the different possible values of the index g. For this purpose, the same parts ECi of the traces Ci or other parts of these traces can be extracted in step S4.

It is noted that the value sets forming the traces Ci may have been collected (steps S2 and S3) before executing the other steps in FIG. 4. In addition, a table HT may have been constituted for each of the traces Ci, before executing steps S9 to S19.

The operation OPR/OPRK applied to the secret data SD and to the input data M[i] may be one or a combination of the following operations:
- a symmetrical or asymmetrical ciphering or deciphering operation, the secret data SD being the encryption or decryption key,
- a signature operation using the secret data SD,
- a modular or non-modular multiplication by the secret data (M[i]×SD),
- an XOR logic operation (Exclusive OR) with the secret data (M[i] XOR SD),
- a modular exponentiation operation, the secret data SD being used as exponent ($M[i]^{SD}$ mod n, n being known),
- a modular reduction operation, the secret data SD being used as modulus (M[i] mod SD),
- a substitution operation by a value selected in a substitution table using the input data (SBOX[M[i]], SBOX being the substitution table), and
- an operation combining an XOR logic operation applied to the secret data and the substitution operation replacing the result of the logic operation with a value selected in a substitution table using the result of the XOR operation (SBOX[M[i] XOR SD]).

More generally, this operation must enable a part of the final value of the operation to be computed based solely on a part of the secret data and an input data.

Figure 7:
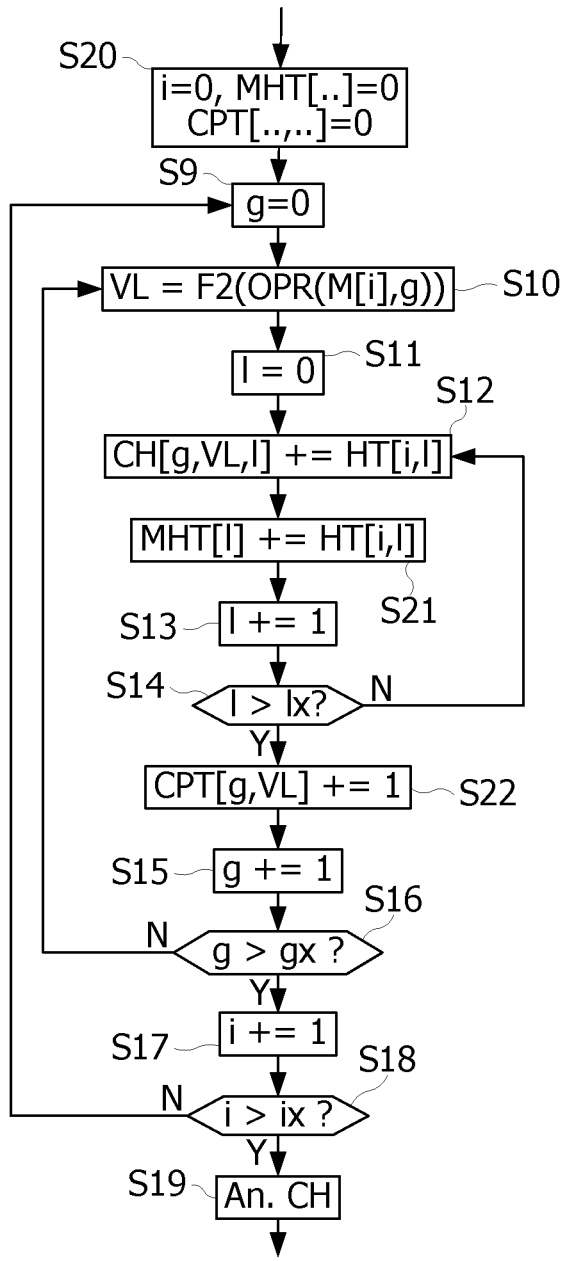
FIG. 7 illustrates a method for testing a secure circuit, according to another embodiment.

To highlight the accumulated values corresponding to the information about the secret data, the contents of all the tables HT can be added to each other to obtain a table of cumulative occurrence numbers for each possible value returned by the function F1. The values of this table of cumulative totals are subtracted from all the tables accumulated in the locations of the table CH[g,VL]. Therefore, the sequence of steps in FIG. 4 may be modified in accordance with the sequence illustrated in FIG. 7. The steps (operations, functions, processes, etc.) shown in FIG. 7 include the steps S9 to S19 described above, and additional steps S20, S21 and S22. In step S20, which is carried out before step S9, index i, a one-dimensional table MHT and a two-dimensional table CPT are set to 0. In step S9, a two-dimensional table HT[0 . . . ix,I] has been previously filled in to contain all the tables generated in step S6 for all the traces Ci. Step S21 is inserted into the loop (between steps S12 and S14) controlled by the index I whereby it is possible to select one of the values provided by the function F1, for example after step S12. In step S21, the processing unit PC accumulates each value HT[i,I] in a table of cumulative totals MHT at a location designated by the index I. In this way, at the end of the processing, the table MHT will contain the sum of all the values HT[i,I] of index i obtained for each of the traces Ci. Step S22 is executed once upon each iteration of the loop controlled by the index i, where it is possible to select one of the traces Ci, for example after step S14. Step S22 enables the number of tables HT[i,I] accumulated in each location CH[g,VL] of the table CH to be counted. The result of this counting is stored in a table CPT.

Figure 8:
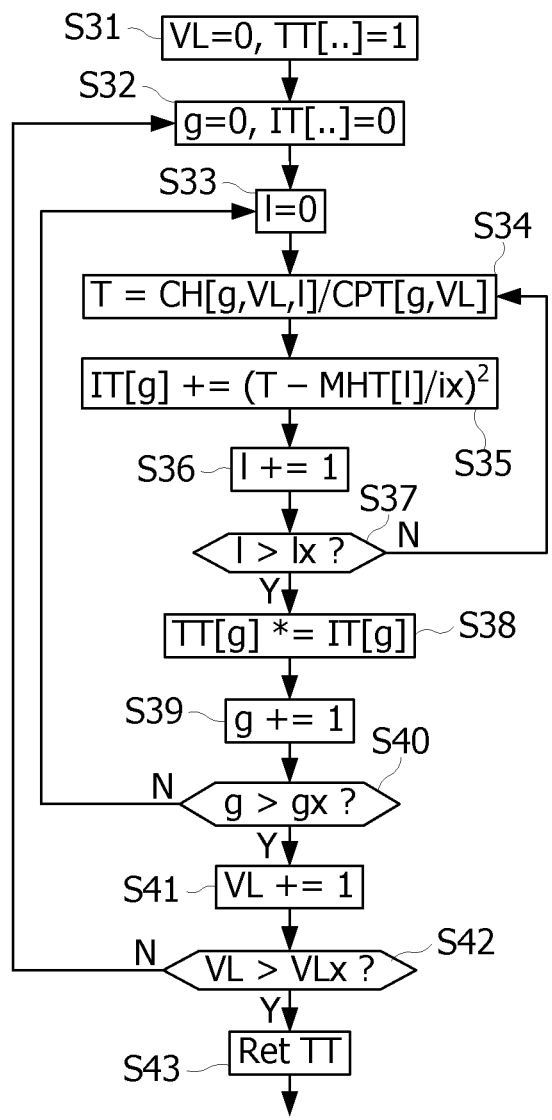
FIGS. 8 and 9 illustrate methods for statistically analyzing a value set obtained by a test method, according to various embodiments.

FIG. 8 illustrates steps (operations, functions, processes, etc.) S31 to S43 of an example of statistical processing of the table CH to attempt to determine the value of the part of the secret data SD searched for. Steps S31 to S37 are successively executed. In step S31, the index VL is set to 0 and all the locations of a table TT are set to 1. In step S32, the index g and all the locations of a table IT are set to 0. In step S33, the index I is set to 0. In step S34, a variable T receives the value CH[g,VL,I] contained in the table CH, selected by the indices g, VL, and I, this value being divided by the counting value located at the location CPT[g,VL] in the table CPT. In step S35, the value IT[g] at the location g in the table IT is incremented by the squared result of the division by the total number ix of traces Ci, of the difference between the value of the variable T and the value MHT[I] stored in the table MHT, designated by index I. In step S36, the index I is incremented by one (1). In step S37, the index I is compared with its maximum value Ix. If the index I has reached its maximum value Ix, steps S38 to S40 are executed, otherwise a new iteration from step S34 is executed.

In step S38, the value TT[g] designated by the index g in the table TT is updated by being multiplied by the value IT[g] computed in steps S35 to S37, executed Ix times. In step S39, the index g is incremented by one (1). In step S40, the index g is compared with its maximum value gx. If the index g is greater than its maximum value gx, steps S41 and S42 are executed, otherwise a new iteration from step S33 is executed. In step S41, the index VL is incremented by one (1). In step S42, the index VL is compared with its maximum value VLx. If the index VL is greater than its maximum value VLx, step S43 is executed, otherwise a new iteration from step S32 is executed. In step S43, the table TT is returned as result of the statistical analysis.

Therefore, upon the last iteration of the processing loop including steps S32 to S42, the tables IT and TT contain the following values:

$$IT[g, VL] = \sum_{I=0}^{Ix} \left[ \frac{CH[g, VL, I]}{CPT[g, VL]} - \frac{MHT[I]}{ix} \right]^2 \quad (2)$$

$$TT[g] = \prod_{VL=0}^{VLx} IT[g, VL] \quad (3)$$

with $CPT[g, VL] = \sum_{i=0}^{ix} (F2(OPR(M[i], g)) = VL)$, and $$MHT[I] = \sum_{g=0}^{gx} \left[ \sum_{VL=0}^{VLx} CH[g, VL, I] \right],$$

where the operator "==" represents the equality test (equal to 1 when the equality is true, and to 0 when the equality is false), the table IT being set to 0 in step S32 and loaded in step S35 for each new value of the index VL.

Therefore, CPT[g,VL] represents the number of times the condition (F2(OPR(M[i],g))==VL) is true. If the secret data SD leaked when executing the operation OPRK, a location of the table TT contains a much higher value than the other values stored in this table. The result is that the part of the secret data SD searched for is equal to the index g of the highest value in the table TT.

It is noted that the values of the table IT can be added rather than being multiplied in step S38 corresponding to the equation (3). The implementation of a multiplication operation merely enables the differences between the values of the table TT to be increased, and thus the highest value corresponding to the part of the secret data being searched for to be better highlighted. It is also possible to consider applying the logarithm function to the values of the table IT and performing an additive accumulation of the logarithm values obtained, in the table TT. When the values of the tables IT are added, they can be weighted as follows:

$$TT[g] = \frac{1}{ix} \sum_{VL=0}^{VLx} CPT[g, VL] \cdot IT[g, VL]. \tag{4}$$

Figure 9:
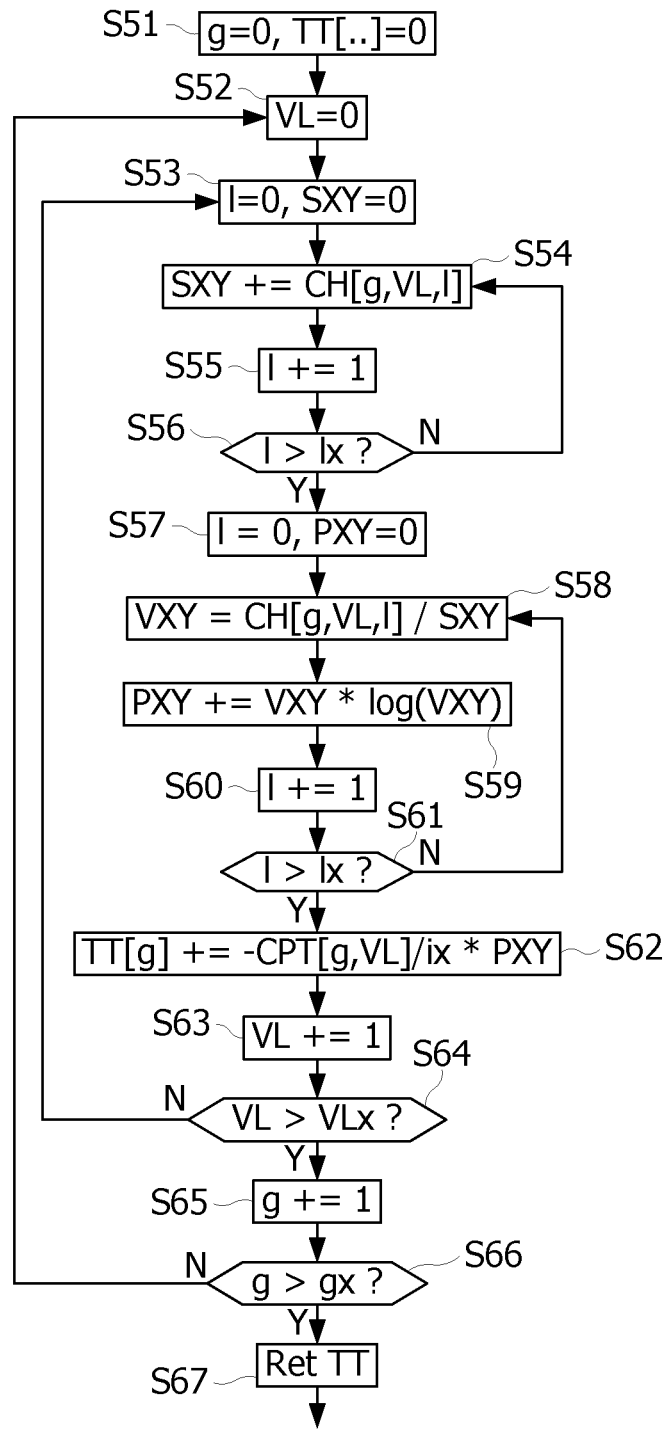

FIG. 9 illustrates steps (operations, functions, processes, etc.) S51 to S67 of another example of statistical processing of the table CH to attempt to determine the value of a part of the secret data SD being searched for. This processing is based on the Shannon entropy function. Steps S51 to S56 are successively executed. In step S51, the index g is set to 0 and all the locations of the table TT are set to 0. In step S52, the index VL is set to 0. In step S53, the index I and a variable SXY are set to 0. In step S54, the variable SXY is incremented by the value CH[g,VL,I] selected in the table CH, by the indices g, VL, and I. In step S55, the index I is incremented by one (1). In step S56, the index I is compared with its maximum value Ix. If the index I has reached its maximum value Ix, steps S57 to S61 are executed, otherwise a new iteration from step S54 to step S56 is executed. In step S57, the index I and a variable PXY are set to 0. In step S58, a variable VXY receives the value CH[g,VL,I] selected in the table CH by the indices g, VL, and I, this value being divided by the variable SYX computed by iterations from step S54 to S56. In step S59, the variable PXY is incremented by the product of the variable VXY by the logarithm (for example in base 2) of the variable VXY. In step S60, the index I is incremented by one (1). In step S61, the index I is compared with its maximum value Ix. If the index I has reached its maximum value Ix, steps S62 to S64 are executed, otherwise a new iteration from step S58 to step S61 is executed.

In step S62, the value TT[g] designated by the index g in the table TT is updated by subtracting from it the product of the value CPT[g,VL] divided by the number ix of traces Ci, by the variable PXY, the value CPT[g,VL] being designated by the indices g and VL in the table CPT filled in step S22. In step S63, the index VL is incremented by one (1). In step S64, the index VL is compared with its maximum value VLx. If the index VL is greater than its maximum value VLx, steps S65 and S66 are executed, otherwise a new iteration from step S53 is executed. In step S65, the index g is incremented by one (1). In step S66, the index g is compared with its maximum value gx. If the index g is greater than its maximum value gx, step S67 is executed, otherwise a new iteration from step S52 is executed. In step S67, the table TT is returned as result of the statistical analysis.

Therefore, upon the last iteration, after step S66, the table TT contains the following values:

$$TT[g] = -\sum_{VL=0}^{VLx} \left[ \frac{CPT[g, VL]}{ix} \cdot \sum_{I=0}^{Ix} \frac{CH[g, VL, I]}{SXY} \cdot \log\left(\frac{CH[g, VL, I]}{SXY}\right) \right] \tag{5}$$

where $$SXY = \sum_{I=0}^{Ix} CH[g, VL, I]$$

is computed for each of the values of the indices g and VL, and each value of the index g represents a possible value of the part of the key searched for. If the secret data SD leaked when processing the operation OPRK, a location of the table TT contains a much higher value than the other values stored in this table. The result is that the part of the secret data SD searched for is equal to the index g of the highest value in the table TT.

Figure 10:
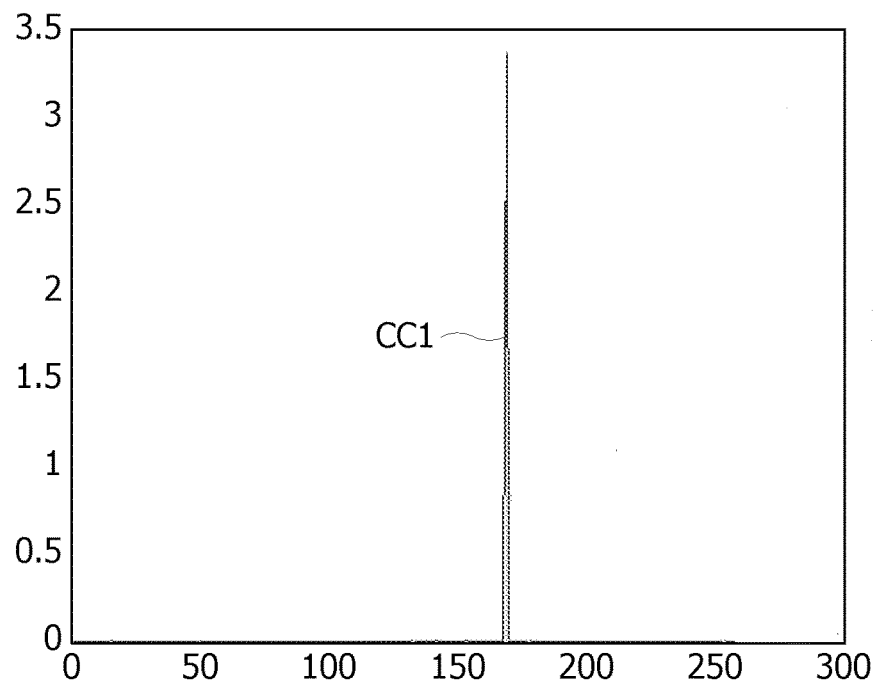
FIGS. 10 and 11 illustrate, in the form of curves, result tables provided by the analysis methods of FIGS. 8 and 9, FIGS. 12 and 13 illustrate an encryption operation, including counter-measure steps, according to various embodiments.
Figure 11:
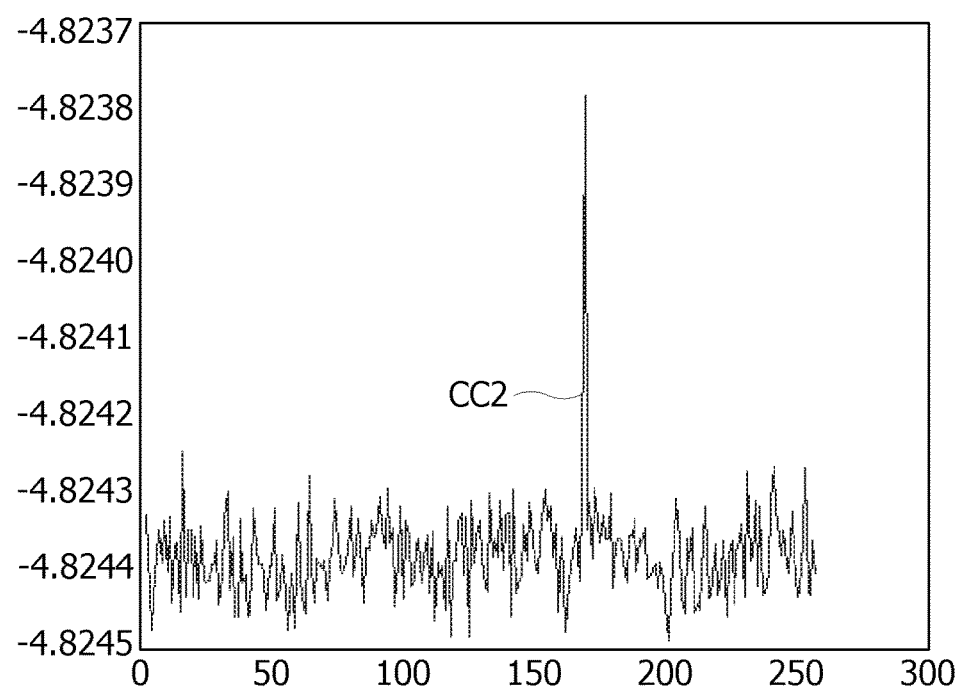

FIGS. 10 and 11 illustrate, in the form of curves CC1, CC2, an example of content of the table TT as a function of the index g. The curve CC1 was obtained by executing the steps in FIG. 8, and the curve CC2 was obtained by executing the steps in FIG. 9. In the example of FIGS. 10 and 11, the index g has a length of one byte (thus varying from 0 to 255), and curves CC1 and CC2 have been obtained from a number of traces Ci of the order of 500,000. Curves CC1 and CC2 have a clear peak at the value g=168 compared to the other values contained in the table TT. The value of the peak in the curve CC1 is greater than about thirty times the other values of the table TT. In the curve CC2, the value of the peak is greater than three times the other values of the table TT. Depending on the statistical processing of the table CH, it may be considered that the part of the secret data being searched for leaks when a peak is obtained that remains at a value greater than 0.9 times the closest value, by increasing the number of analyzed traces Ci.

Effectiveness of conventional counter-measures in relation to the test method according to the present invention So that circuits, such as integrated circuits, as described herein can successfully pass known qualification or certification procedures, the designers of these circuits provide counter-measures the most conventional of which involve introducing a time variable. This arrangement can be made by causing the duration of the clock cycle supplied to the circuit to vary randomly, or by introducing dummy processing cycles or operations at times chosen randomly. The calculation of the values in the tables HT enables the time aspect to be removed from the analyzed values, and avoids having to synchronize the different traces of the analyzed values. Provided that information concerning the secret data being searched for is in the analyzed data, the test method previously described may enable all or part of the secret data to be determined.

Appropriate Counter-Measures

Some embodiments can implement counter-measures that enable a circuit to be considered capable of being used (securely used) after testing with a qualification or certification test including the test method previously described.

Approaches described herein can protect an encryption operation (implemented by a circuit) against an analysis implemented by the test methods previously described. In this context, the operation receives an input data, and provides an output data according to the value of the input data. A counter-measure according to one embodiment involves executing the operation to be protected for all the data of a set of input data including, only once, all the possible data susceptible of being processed by the operation and including the data to be processed by the operation. Another counter-measure involves providing as result of the operation a set of output data including only once all the possible data susceptible of being provided by the operation. The set of output data can be reduced to a subset of data whereof the transformed data resulting from the application of a chosen surjective function include, only once, all the data susceptible of being obtained by this function, including the output data expected from the operation, corresponding to the input data. The chosen surjective function may correspond to the leakage pattern of the circuit or the software program to be protected.

Unlike previous counter-measures involving "hiding" ("drowning", etc.) the operation to be protected in a flood of identical operations concerning random data and thus uncorrelated from the input data of the operation to be protected, the idea here is to have the operation executed on other data not be chosen randomly. Indeed, such other data can be correlated to the input data insofar as the set formed of such other data and of the data to be processed includes all the data susceptible of being processed by the operation.

Figure 12:
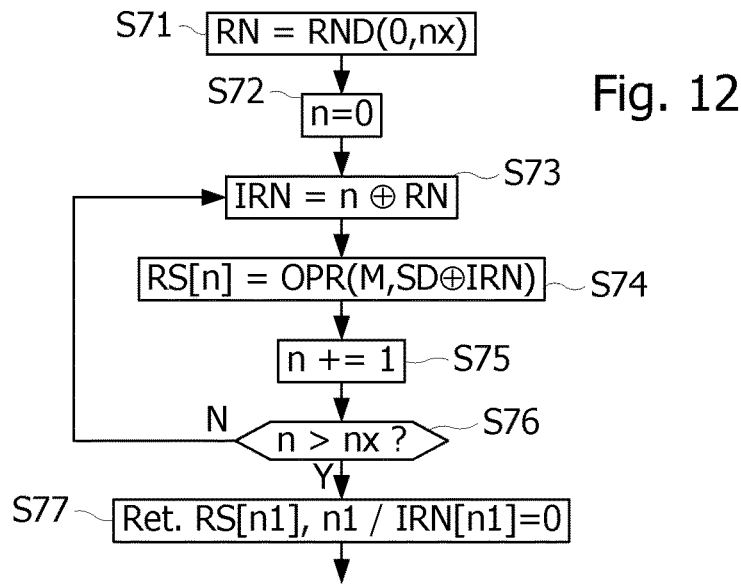

FIG. 12 illustrates steps (operations, functions, processes, etc.) S71 to S77 of a method for computing an encryption operation which involves a secret data SD, according to one embodiment. This method is configured to successfully pass the test described above. Steps S71 to S76 are executed successively. In step S71, a variable RN receives a random value between 0 and a maximum value nx determined according to the number of bits used to encode this variable in binary code. Therefore, if the variable RN is encoded on 8 bits, nx is equal to 255. In step S72, an index n is set to 0. In step S73, a variable IRN is computed by combining the index n with the variable RN by an Exclusive OR operation. In step S74, an output data RS[n] designated by the index n in a result table RS is computed by applying the encryption operation OPR as defined above, to an input data M, and to the secret data SD. According to one embodiment, the secret data SD is here combined for example by an XOR operation (Exclusive OR) with the variable IRN:

$$RS[n]=OPR(M,SD\oplus IRN), \quad (6)$$

"$\oplus$" representing the Exclusive OR operator.
Alternatively, the variable IRN may be combined with the input data M:

$$RS[n]=OPR(M\oplus IRN,SD), \quad (7)$$

or with the result of the operation:

$$RS[n]=OPR(M,SD)\oplus IRN, \quad (8)$$

In step S75, the index n is incremented by one (1). In step S76, the index n is compared with the maximum value nx, and if it is lower than or equal to the value maximum nx, a new iteration of the calculation from step S73 to S76 is executed. In the opposite case, step S77 is executed. In step S77, the output data being searched for, contained in the table RS at an index n1 is returned, this index n1 having the value of the index n of the iteration where the variable IRN was on 0, if the combination operation with the value IRN in step S74 is a XOR operation. Indeed, the result of the Exclusive OR operation applied to a data D and 0 does not transform the data D. It is noted that the output data being searched for in the table RS can be extracted, in step S77, after other operations. In this case, all the data stored in the table RS is processed by such other operations. Therefore, in the case of the AES algorithm, for example, the operation OPR is, for example, the XOR operation combining an input data with a first key used in a first round of the algorithm. The following (subsequent, etc.) operations of the AES algorithm can be executed on all the data stored in the table RS, and the successive results of these operations stored in the table RS. Therefore, the operations of shifting rows and mixing columns can be applied to each element of the table RS. The output data being searched for can be extracted from the result table RS at a subsequent step in the processing considered less sensitive to attacks. These arrangements are also applicable to the DES and/or the Triple DES algorithm.

Furthermore, the input data M and the secret data SD are encoded by binary words having a same number of bits. Each value given to the variable IRN must also have the same number of bits as the data M and SD. If the data M and SD are encoded by 8-bit words, the variable IRN is also encoded on 8 bits. The number of iterations nx that must be executed between steps S73 to S76 is equal to 2x, x being the size in number of bits of the data M and SD. If the data M and SD are encoded by words of 16, 32 or 64 bits, it may be desirable to limit this number of iterations. For this purpose, the variable IRN may be encoded on 8 bits, and the operations of combining the secret data SD or the input data with the variable IRN can be performed by concatenating the variable IRN with itself several times to form a word of the size of the secret data SD or of the input data M. Therefore, in the event that the data M and SD are encoded on 16 bits, the variable IRN on 8 bits is concatenated with itself to obtain a data on 16 bits. The operation executed in step S73 then becomes:

$$RS[n]=OPR(M,SD\oplus IRN//IRN), \quad (9)$$

"//" representing the concatenation operator of binary words. In the event that the data M and SD are encoded on 32 bits, each value of the variable IRN on 8 bits is concatenated with itself 3 times to obtain a value on 32 bits. The operation executed in step S73 then becomes:

$$RS[n]=OPR(M,SD\oplus IRN//IRN//IRN//IRN). \quad (10)$$

More generally, when the variable IRN is combined upon each iteration with the output data of the operation OPR, the values of the variable IRN can be chosen in such a way that their transformed values resulting from the application of a chosen surjective function F3 include, only once, all the possible values susceptible of being obtained by this function. The function F3 may be the identity function, as is the case in the method of FIG. 12, or a function of which the image set is smaller, as in the method of FIG. 13.

Figure 13:
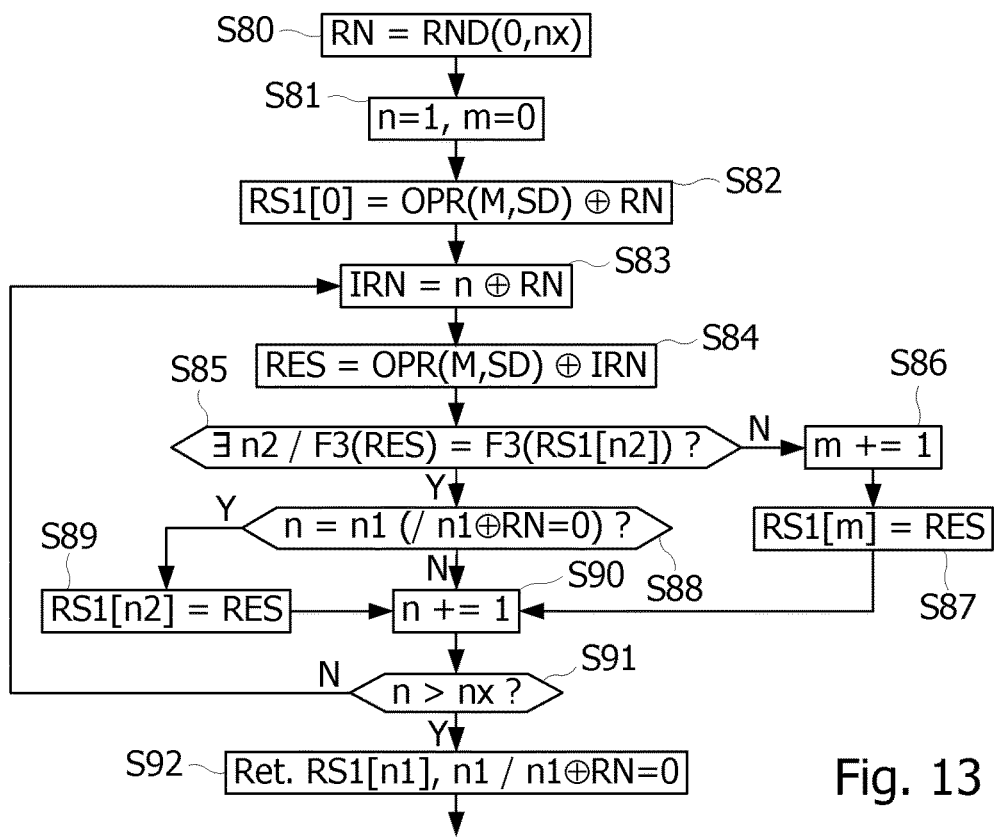

FIG. 13 illustrates steps (operations, functions, processes, etc.) S80 to S92 of a method for computing an encryption operation which involves a secret data SD, according to another embodiment. This method is configured to successfully pass the tests previously described. Steps S80 to S54 are executed successively. Step S80 is identical to step S71. In step S81, an index n is set to 1 and an index m is set to 0. In step S82, the value at the index 0 of a table RS1 receives the result of the operation OPR applied to the input data M and to the secret data SD, this result being combined with the random data RN by the Exclusive OR operation. Step S83 is identical to step S73. Step S84 is identical to step S74 except that the result of the computation performed in this step is stored by a variable RES. In addition, the data IRN computed in step S83 is combined by an Exclusive OR operation with the result provided by the operation OPR. In step S85, the transformed value of the variable RES resulting from the application of the function F3 is compared with the transformed values by the function F3 of the other data stored in the table RS at the locations designated by indices lower than or equal to the index m. If the transformed value F3(RES) of variable RES is different from such other data, the index m is incremented by one (1) and the variable RES is stored in the table RS1 at the location designated by the index m, in steps S86 and S87. Otherwise there exists an index n2 such that transformed value F3(RES) of variable RES equals to the transformed value F3(RS1[n2]) of the value RS1[n2] in the table RS at index n2. In such a case, the index n is compared at step S88 with an index value n1 where the unmasked result of the operation OPR is stored in the table RS (n1⊕RN=0). If the index n equals the index value n1, the result RES is the true result of the operation OPR and it is stored in the table RS1 at index n2 at step S89. The step S90, where the index n is incremented by one (1), is performed after steps S87, S89 and S88 (when the index n does not correspond to index n1). In the next step S91, the index n is compared with the value nx, and if it is lower than or equal to the value nx, a new iteration of the computation from step S83 to S91 is executed. Otherwise, step S92 is executed. Step S92 is identical to step S77, except that it is applied to the table RS1.

The function F3 may be chosen so as to correspond to the leakage pattern of the circuit or of the software program to be protected. Therefore, the function F3 may, for example, be the Hamming function.

Another counter-measure can be implemented when the operation to be protected includes an operation of reading a lookup table, at an index corresponding to the input data of the operation and to the secret data to be protected or to a data from which the secret data can be determined. According to one embodiment, the entire lookup table is read and for example loaded into a set of resulting data, such as the table RS. As above, the set of data stored in the table RS can be applied as an input of a next operation, each data of the table being transformed by this operation. As the location of the output data in the table RS is known, the circuit can extract the output data at any time.

Figure 14:
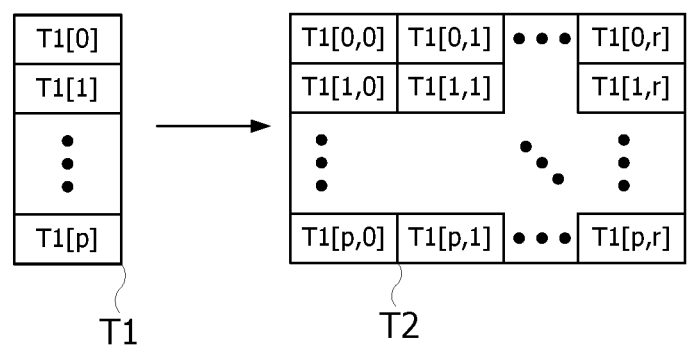
FIG. 14 illustrates a substitution table, transformed according to a counter-measure method, according to one embodiment.

According to one embodiment, the lookup table is transformed into a new table in which each location contains all the possible values susceptible of being contained in the lookup table. Therefore, FIG. 14 represents a lookup table T1, from which it is possible to determine the result of an encryption operation according to input values varying from 0 to p. According to one embodiment, the table T1 is replaced with a new table T2, having an additional dimension such that T2[i,k0]=T1[i] for all the possible values of the index i between 0 and p. Furthermore, all the values T2[i,k], when k varies from 0 to r, include all the possible values of the values susceptible of being stored in the table T1. Therefore, if these values are encoded on one byte, the maximum value r of the index k is equal to 255 and all the values T2[i,k], when the index i is secured, and the index k varies from 0 to r, are different. Therefore, all the tables T2[i,j] designated by the index i contain the same values, but are ordered differently. For example, the data in the table may be defined in the following manner:

$$T2[i,k]T1[i] \oplus (k+k0) \bmod (r+1). \quad (11)$$

for all the values k from 0 to r.

The execution of the operation to be protected thus involves loading in a result table (the table RS for example), all the values of the table T2 designated by the index i defined from the input data (and possibly the secret data):

$$RS[0 \ldots r]=T2[i,0 \ldots r]$$

As above, step S77 or S90 can then be executed to obtain the output data being searched for in the result table RS.

The value of the index k0 such that T2[i,k0]=T1[i], e.g., containing the output data of the operation, may be fixed for the entire table T2 or vary on each row of the table. For example, the column T2[0 . . . p,k0] may contain table T1. In another example, the table element T2[0,k0] may be equal to the element T1[0], the element T2[1,k0+1] may be equal to the element T1[1], and so on and so forth up to the element T2[p, (k0+p) mod(r+1)] equal to the element T1[p]. If in this example, the shift pitch from one row to the next of the table T2 is one, it can be set to any other value between 1 and r−2.

Instead of containing all the values between 0 and r, each table element T2[i] selected by the index i, may contain only values including the expected output data, such that their transformed values resulting from the application of the chosen surjective function F3 are all different and include all the possible values susceptible of being obtained by this function. This arrangement enables the size of the table T2 to be reduced, without reducing the robustness of the method, if the function F3 reproduces the leakage pattern of the secret data.

It will be understood that, while table T1 has two dimensions, table T2 has three dimensions, each element of the table T1 being replaced with a one-dimensional table containing all the possible values of the elements of table T1.

Figure 15:
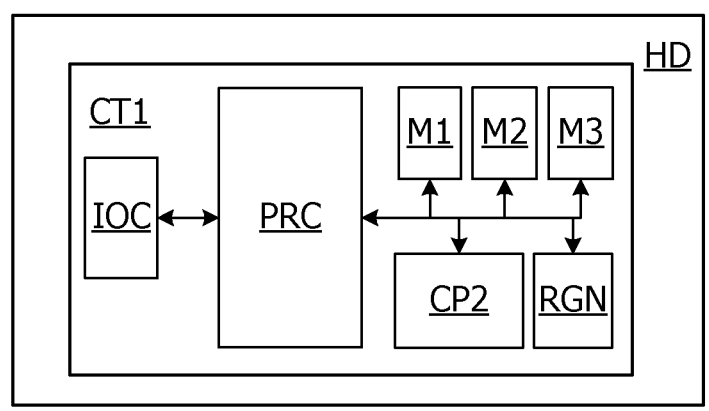
FIG. 15 illustrates a secure circuit, according to one embodiment.

FIG. 15 illustrates an integrated circuit CT1 arranged on a portable medium HD such as a plastic card, and equipped with a counter-measure according to one embodiment. The integrated circuit includes the same units as the integrated circuit CT described above in connection with FIG. 1, and differs from the latter in that the coprocessor CP1 is replaced with a coprocessor CP2 implementing at least one of the counter-measures described above. Therefore, according to one embodiment, the coprocessor CP2 is configured to provide a table of resulting values, rather than a single result of an encryption operation, including only values such that their respective transformed values resulting from the application of a chosen surjective function are all different and include all the possible values susceptible of being obtained by the surjective function, including the expected result of the encryption operation. The processor PRC is matched with the coprocessor CP2 so as to know the location of the result of the encryption operation in the table of resulting values provided by the coprocessor CP2.

The coprocessor CP2 may also be configured to execute a part of the encryption operation. In this case, the processor PRC is configured to produce the table of resulting values including only values such that their respective transformed values resulting from the application of a chosen surjective function are all different and include all the possible values susceptible of being obtained by the surjective function, including the result of the encryption operation.

In a general aspect, a test method can include acquiring a plurality of value sets. Each value set can include values of a physical quantity, or of logic signals that are linked to the activity of a circuit to be tested when the circuit executes an operation of an operation set of distinct cryptographic operations applied to a same data to be discovered. For each value set, the test method can also include counting occurrence numbers of values transformed by a first surjective function applied to values of the value set, to form an occurrence number set for the value set. For each operation of the operation set, and each of the possible values of a part of the data to be discovered, the method can further include computing a partial operation result. The method can still also include computing cumulative occurrence number sets. Each cumulative occurrence number set can be obtained by adding the occurrence number sets corresponding to the operations of the operation set, which when applied to a same value or equivalent value of the possible values of the part of the data to be discovered provide a partial operation result having a same transformed value resulting from the application of a second surjective function. The method can yet further include analyzing the cumulative occurrence number sets to determine the part of the data to be discovered, knowing that if the data to be discovered has leaked into the value sets, it is found in the cumulative occurrence number sets corresponding to the value of the part of the data to be discovered.

Implementations can include one or more of the following features. For example, the method can include selecting values in each value set, the counting of occurrence numbers being performed on the selected values. The method can include transmitting, to the circuit, a plurality of distinct commands, each command triggering the execution, by the circuit, of one of the operations of the operation set applied to the data to be discovered; and, during the execution by the circuit of one operation of the operation set, collecting, by a measuring device, the values of one of the value sets. The value sets can include measurements of current consumption of the circuit, and/or measurements of electromagnetic radiation emitted by the circuit, and/or measurements of absorption of magnetic field present around the circuit, and/or logic signals or digital values collected in the circuit.

Each of the first and second surjective functions can be one of the following functions: an identity function, a function providing a resultant value which is then reduced to a value corresponding to a Hamming weight, a function providing the Hamming weight of the value to which the function is applied, or a function providing a Hamming distance between a value and a preceding value to which the function is applied.

The method can include rejecting the circuit or the program executed by the circuit if the analyzing determines the part of the data to be discovered.

Computing an operation result for each of the possible values of a part of the data to be discovered, computing the cumulative occurrence number sets and analyzing the cumulative occurrence number sets can be performed for a previously determined part of the data to be discovered and another part of the data to be discovered.

The selected values in each value set can include consecutive values of the value set, and/or non-consecutive values of the value set, and/or local extremum values of the value set, and/or all the values of the value set. The operations of the operation set can include applying a single operation to the data to be discovered and to an input data of a set of input data. The single operation can include (at least) one of the following operations: a symmetrical or asymmetrical encryption or decryption operation, a signature operation, a modular or non-modular multiplication by the data to be discovered, a logic Exclusive OR operation with the data to be discovered, a modular exponentiation operation, the data to be discovered being used as exponent, a modular reduction operation, the data to be discovered being used as modulus, a substitution operation by a value selected in a substitution table using the input value, and an operation combining a logic Exclusive OR operation with the data to be discovered and a substitution operation replacing the result of the logic operation with a value selected in a substitution table using the result of the logic operation.

The analysis of the cumulative occurrence number sets can include: for each cumulative occurrence number, computing a normalized cumulative occurrence number by dividing the cumulative occurrence number by a corresponding number of occurrence numbers accumulated in the cumulative occurrence number, for each possible value of the part of the data to be discovered and each possible value of the transformed partial result, computing a sum of squared differences, between each normalized cumulative occurrence number corresponding to the possible value of the part of the data to be discovered and the possible value of the transformed partial result, and an average value of the cumulative occurrence numbers, divided by a number of operations, for each possible value of the part of the data to be discovered, computing a cumulative total of difference sums corresponding to the possible values of the transformed partial results, and comparing with each other the cumulative totals of difference sums, and detecting whether one of the cumulative totals of difference sums for a possible value of the part of the data to be discovered is greater than the other cumulative totals of difference sums.

The analysis of the cumulative occurrence number sets can include: for each possible value of the part of the data to be discovered and each possible value of the transformed partial result, computing a cumulative total of the cumulative occurrence numbers, for each cumulative occurrence number, computing a normalized cumulative total by dividing the cumulative occurrence number by the corresponding cumulative total, and computing the product of the normalized cumulative total by the logarithm of the normalized cumulative total, for each possible value of the part of the data to be discovered and each possible value of the transformed partial result, computing a sum of the products corresponding to the possible value of the part of the data to be discovered and the possible value of the transformed partial result, for each possible value of the part of the data to be discovered, computing a cumulative total of the product sums corresponding to the possible values of the transformed partial results, each product sum being multiplied by a corresponding number of cumulative occurrence numbers, and comparing with each other the cumulative totals of product sums, and detecting whether one of the cumulative totals of product sums for a possible value of the part of the data to be discovered is greater than the other cumulative totals of product sums.

In another general aspect, a system for testing a circuit can include: a measuring device configured to receive a physical quantity or logic signals, linked to the activity of a circuit to be tested, and a processing unit. The processing unit can be configured to: acquire, using the measuring device, a plurality of value sets, each value set including values of the physical quantity or the logic signals, when the circuit to be tested when the circuit executes an operation of an operation set of distinct cryptographic operations applied to a same data to be discovered, for each value set, count occurrence numbers of values transformed by a first surjective function applied to values of the value set, to form an occurrence number set for the value set, for each operation of the operation set, and each of the possible values of a part of the data to be discovered, compute a partial operation result, compute cumulative occurrence number sets, each cumulative occurrence number set being obtained by adding the occurrence number sets corresponding to the operations of the operation set, which when applied to a same value or equivalent value of the possible values of the part of the data to be discovered, provide a partial operation result having a same transformed value resulting from the application of a second surjective function, and analyze the cumulative occurrence number sets to determine the part of the data to be discovered, knowing that if the data to be discovered has leaked into the value sets, it is found in the cumulative occurrence number sets corresponding to the value of the part of the data to be discovered.

Implementations can include one or more of the following features. For example, the system can include a measuring probe coupled to the measuring device for acquiring traces linked to the activity of the circuit. The system can include an emulator executing an application to be tested.

The processing unit (computing unit) can be configured to select values in each value set. The counting of occurrence numbers can be performed by the computing unit on the selected values. The computing unit can be configured to: transmit to the circuit a plurality of distinct commands, each command triggering the execution by the circuit of one of the operations of the operation set, applied to the data to be discovered, and collect, using a measuring device, the values of one of the value sets during the execution by the circuit of one operation of the operation set.

The value sets can include: measurements of current consumption of the circuit, and/or measurements of electromagnetic radiation emitted by the circuit, and/or measurements of absorption of magnetic field present around the circuit, and/or logic signals or digital values collected in the circuit.

Each of the first and second surjective functions can be one of the following functions: an identity function, a function providing a resultant value which is then reduced to a value corresponding to a Hamming weight, a function providing the Hamming weight of the value to which the function is applied, or a function providing a Hamming distance between a value and a preceding value to which the function is applied.

The computing unit can be configured to reject the circuit or the program executed by the circuit if the analyzing step determines the part of the data to be discovered. The computing unit can be configured to perform the operations of computing an operation result for each of the possible values of a part of the data to be discovered, of computing the cumulative occurrence number sets, and of analyzing the cumulative occurrence number sets, for a previously determined part of the data to be discovered and another part of the data to be discovered to be discovered.

The selected values in each value set can include: consecutive values of the value set, and/or non-consecutive values of the value set, and/or local extremum values of the value set, and/or all the values of the value set.

The operations of the operation set can include applying a single operation to the data to be discovered and to an input data of a set of input data. The single operation can include (at least) one of the following operations: a symmetrical or asymmetrical encryption or decryption operation, a signature operation, a modular or non-modular multiplication by the data to be discovered, a logic Exclusive OR operation with the data to be discovered, a modular exponentiation operation, the data to be discovered being used as exponent, a modular reduction operation, the data to be discovered being used as modulus, a substitution operation by a value selected in a substitution table using the input value, and an operation combining a logic Exclusive OR operation with the data to be discovered and a substitution operation replacing the result of the logic operation with a value selected in a substitution table using the result of the logic operation.

The analysis of the cumulative occurrence number sets can include: for each cumulative occurrence number, computing a normalized cumulative occurrence number by dividing the cumulative occurrence number by a corresponding number of occurrence numbers accumulated in the cumulative occurrence number, for each possible value of the part of the data to be discovered and each possible value of the transformed partial result, computing a sum of squared differences, between each normalized cumulative occurrence number corresponding to the possible value of the part of the data to be discovered and the possible value of the transformed partial result, and an average value of the cumulative occurrence numbers, divided by a number of operations, for each possible value of the part of the data to be discovered, computing a cumulative total of difference sums corresponding to the possible values of the transformed partial results, and comparing with each other the cumulative totals of difference sums, and detecting whether one of the cumulative totals of difference sums for a possible value of the part of the data to be discovered is greater than the other cumulative totals of difference sums.

The analysis of the cumulative occurrence number sets can include: for each possible value of the part of the data to be discovered and each possible value of the transformed partial result, computing a cumulative total of the cumulative occurrence numbers, for each cumulative occurrence number, computing a normalized cumulative total by dividing the cumulative occurrence number by the corresponding cumulative total, and computing the product of the normalized cumulative total by the logarithm of the normalized cumulative total, for each possible value of the part of the data to be discovered and each possible value of the transformed partial result, computing a sum of the products corresponding to the possible value of the part of the data to be discovered and the possible value of the transformed partial result, for each possible value of the part of the data to be discovered, computing a cumulative total of the product sums corresponding to the possible values of the transformed partial results, each product sum being multiplied by a corresponding number of cumulative occurrence numbers, and comparing with each other the cumulative totals of product sums, and detecting whether one of the cumulative totals of product sums for a possible value of the part of the data to be discovered is greater than the other cumulative totals of product sums.

In another general aspect, a non-transitory computer-readable medium can carry (include, have stored thereon, etc.) one or more sequences of instructions, which, when executed, by one or more processors, can cause the one or more processors to: acquire by means of (using) a measuring device, a plurality of value sets, each value set including values of the physical quantity or the logic signals, when a circuit to be tested when the circuit executes an operation of an operation set of distinct cryptographic operations applied to a same data to be discovered, for each value set, count occurrence numbers of values transformed by a first surjective function applied to values of the value set, to form an occurrence number set for the value set, for each operation of the operation set, and each of the possible values of a part of the data to be discovered, compute a partial operation result, compute cumulative occurrence number sets, each cumulative occurrence number set being obtained by adding the occurrence number sets corresponding to the operations of the operation set, which when applied to a same value or equivalent value of the possible values of the part of the data to be discovered, provide a partial operation result having a same transformed value resulting from the application of a second surjective function, and analyze the cumulative occurrence number sets to determine the part of the data to be discovered, knowing that if the data to be discovered has leaked into the value sets, it is found in the cumulative occurrence number sets corresponding to the value of the part of the data to be discovered.

Implementations can include one or more of the following features. For example, the one or more sequences of instructions, when executed by one or more processors, can cause the one or more processors to select values in each value set, the counting of occurrence numbers being performed by the computing unit on the selected values.

The one or more sequences of instructions, when executed by one or more processors, can cause the one or more processors to transmit to the circuit a plurality of distinct commands, each command triggering the execution by the circuit of one of the operations of the operation set, applied to the data to be discovered, and collect by means of a measuring device, the values of one of the value sets during the execution by the circuit of one operation of the operation set.

The value sets can include: measurements of current consumption of the circuit, and/or measurements of electromagnetic radiation emitted by the circuit, and/or measurements of absorption of magnetic field present around the circuit, and/or logic signals or digital values collected in the circuit.

Each of the first and second surjective functions can be one of the following functions: an identity function, a function providing a resultant value which is then reduced to a value corresponding to a Hamming weight, a function providing the Hamming weight of the value to which the function is applied, or a function providing a Hamming distance between a value and a preceding value to which the function is applied.

The one or more sequences of instructions, when executed by one or more processors, can cause the one or more processors to reject the circuit or the program executed by the circuit if the analyzing step determines the part of the data to be discovered.

The one or more sequences of instructions, when executed by one or more processors, can cause the one or more processors to perform the operations of computing an operation result for each of the possible values of a part of the data to be discovered, of computing the cumulative occurrence number sets, and of analyzing the cumulative occurrence number sets, for a previously determined part of the data to be discovered and another part of the data to be discovered.

The selected values in each value set can include: consecutive values of the value set, and/or non-consecutive values of the value set, and/or local extremum values of the value set, and/or all the values of the value set.

The operations of the operation set can include applying a single operation to the data to be discovered and to an input data of a set of input data. The single operation can include (at least) one of the following operations: a symmetrical or asymmetrical encryption or decryption operation, a signature operation, a modular or non-modular multiplication by the data to be discovered, a logic Exclusive OR operation with the data to be discovered, a modular exponentiation operation, the data to be discovered being used as exponent, a modular reduction operation, the data to be discovered being used as modulus, a substitution operation by a value selected in a substitution table using the input value, and an operation combining a logic Exclusive OR operation with the data to be discovered and a substitution operation replacing the result of the logic operation with a value selected in a substitution table using the result of the logic operation.

The analysis of the cumulative occurrence number sets can include: for each cumulative occurrence number, computing a normalized cumulative occurrence number by dividing the cumulative occurrence number by a corresponding number of occurrence numbers accumulated in the cumulative occurrence number, for each possible value of the part of the data to be discovered and each possible value of the transformed partial result, computing a sum of squared differences, between each normalized cumulative occurrence number corresponding to the possible value of the part of the data to be discovered and the possible value of the transformed partial result, and an average value of the cumulative occurrence numbers, divided by a number of operations, for each possible value of the part of the data to be discovered, computing a cumulative total of difference sums corresponding to the possible values of the transformed partial results, and comparing with each other the cumulative totals of difference sums, and detecting whether one of the cumulative totals of difference sums for a possible value of the part of the data to be discovered is greater than the other cumulative totals of difference sums.

The analysis of the cumulative occurrence number sets can include: for each possible value of the part of the data to be discovered and each possible value of the transformed partial result, computing a cumulative total of the cumulative occurrence numbers, for each cumulative occurrence number, computing a normalized cumulative total by dividing the cumulative occurrence number by the corresponding cumulative total, and computing the product of the normalized cumulative total by the logarithm of the normalized cumulative total, for each possible value of the part of the data to be discovered and each possible value of the transformed partial result, computing a sum of the products corresponding to the possible value of the part of the data to be discovered and the possible value of the transformed partial result, for each possible value of the part of the data to be discovered, computing a cumulative total of the product sums corresponding to the possible values of the transformed partial results, each product sum being multiplied by a corresponding number of cumulative occurrence numbers, and comparing with each other the cumulative totals of product sums, and detecting whether one of the cumulative totals of product sums for a possible value of the part of the data to be discovered is greater than the other cumulative totals of product sums.

The invention claimed is:

1. A method of testing a circuit, comprising:
   acquiring, by a first processing unit, a plurality of measure sets, each measure set including measures of a physical quantity or logic signals linked to an activity of a tested circuit acquired when the tested circuit executes an operation of an operation set of distinct cryptographic operations applied to a same first data stored by the tested circuit;
   for each measure set, counting, by a second processing unit, occurrence numbers of transformed measure values resulting from a first surjective function applied to the measures of the measure set to form an occurrence number set for the measure set without including any time-related information;
   for each operation of the operation set, and each of possible data values of a part of the first data, computing, by the second processing unit, a partial operation result;
   computing, by the second processing unit, cumulative occurrence number sets of cumulative occurrence numbers, each cumulative occurrence number set being obtained by adding the occurrence number sets corresponding to the operations of the operation set, which, when applied to a same data value or equivalent data value of the possible data values of the part of the first data, provide one of the partial operation results having a same transformed result value resulting from an application of a second surjective function to the partial operation result; and analyzing, by the second processing unit, the cumulative occurrence number sets to detect a data value of the part of the first data, wherein if the first data has leaked into the measure sets, the leakage of the first data is detected in the cumulative occurrence number sets which corresponds to the data value of the part of the first data.

2. The method according to claim 1, further comprising selecting measures in each measure set, the counting of occurrence numbers of transformed measure values being performed on the selected measures.

3. The method according to claim 1, further comprising:
transmitting, to the tested circuit, a plurality of distinct commands, each command triggering the execution by the tested circuit of one of the operations of the operation set applied to the first data; and
during the execution by the tested circuit of one operation of the operation set, collecting, by a measuring device, the measures of one of the measure sets.

4. The method according to claim 1, wherein the measure sets include at least one of:
measurements of current consumption of the tested circuit;
measurements of electromagnetic radiation emitted by the tested circuit;
measurements of absorption of magnetic field present around the tested circuit; or
logic signals or digital data collected in the tested circuit.

5. The method according to claim 1, wherein each of the first and second surjective functions is at least one of the following functions:
an identity function;
a function providing a resultant value which is then reduced to a value corresponding to a Hamming weight;
a function providing the Hamming weight of the value to which the function is applied; or
a function providing a Hamming distance between a value and a preceding value to which the function is applied.

6. The method according to claim 1, further comprising rejecting the tested circuit or a program executed by the tested circuit if the first data has leaked into the measure sets.

7. The method according to claim 1, wherein the computing the operation result for each possible data value of the part of the first data, the computing the cumulative occurrence number sets, and the analyzing the cumulative occurrence number sets are performed for a previously determined part of the first data and another part of the first data.

8. The method according to claim 1, wherein the counting of occurrence numbers of transformed measure values is performed on selected measures in each measure set, the selected measures in each measure set including at least one of:
consecutive measures in the measure set;
non-consecutive measures in the measure set;
local extremum measures in the measure set; or
all the measures in the measure set.

9. The method according to claim 1, wherein each operation of the operation set includes applying a single operation to the first data and to an input data of a set of input data, the single operation including at least one of the following operations:
a symmetrical or asymmetrical encryption or decryption operation;
a signature operation;
a modular or non-modular multiplication operation with the first data;
a logic Exclusive OR operation with the first data;
a modular exponentiation operation, the first data being used as exponent;
a modular reduction operation, the first data being used as modulus;
a substitution operation by a data selected in a substitution table using the input data; or
an operation combining a logic Exclusive OR operation with the first data and a substitution operation replacing a result of the Exclusive OR operation with a data selected in a substitution table using the result of the Exclusive OR operation.

10. The method according to claim 1, wherein the analyzing the cumulative occurrence number sets includes:
for each cumulative occurrence number, computing a normalized cumulative occurrence number by dividing the cumulative occurrence number by a corresponding number of occurrence numbers accumulated in the cumulative occurrence number;
for each possible data value of the part of the first data and each possible transformed result value of the partial operation results, computing a sum of squared differences between each normalized cumulative occurrence number corresponding to the possible data value of the part of the first data and the possible transformed result value of the partial operation result, and computing an average value of the cumulative occurrence numbers, divided by a number of operations in the operation set;
for each possible data value of the part of the first data, computing a cumulative total of difference sums corresponding to the possible transformed result values of the partial operation results; and
comparing, with each other, the cumulative totals of difference sums, and detecting whether one of the cumulative totals of difference sums for one of possible data values of the part of the first data is greater than other cumulative totals of difference sums.

11. The method according to claim 1, wherein the analyzing the cumulative occurrence number sets includes:
for each possible data value of the part of the first data and each of possible transformed result value of the partial operation results, computing a cumulative total of the cumulative occurrence numbers of a corresponding cumulative occurrence number set;
for each cumulative occurrence number, computing a normalized cumulative number by dividing the cumulative occurrence number by the cumulative total of the corresponding cumulative occurrence number set, and computing a product of the normalized cumulative number by a logarithm of the normalized cumulative number;
for each possible data value of the part of the first data and each possible transformed result value of the partial operation result, computing a sum of the products corresponding to the possible data value of the part of the first data and the possible transformed result value of the partial operation results;
for each possible data value of the part of the first data, computing a cumulative total of the sums of products corresponding to the possible transformed result values of the partial operation results, each sum of product being multiplied by a corresponding number of the cumulative occurrence numbers; and comparing, with each other, the cumulative totals of the sums of products, and detecting whether one of the cumulative totals of the sums of products for one of the possible data values of the part of the first data is greater than other cumulative totals of the sums of products.

12. A system for testing a circuit, the system comprising:
a memory; and
one or more processors configured to:
    acquire, via a measuring device, a plurality of measure sets, each measure set including measures of a physical quantity or logic signals acquired when a tested circuit executes an operation of an operation set of distinct cryptographic operations applied to a same first data stored by the tested circuit, the measures of the physical quantity or the logic signals being acquired by a measuring device coupled to the tested circuit;
    for each measure set, count occurrence numbers of transformed measure values resulting from a first surjective function applied to measures of the measure set, to form an occurrence number set for the measure set without including any time-related information;
    for each operation of the operation set, and each of possible data values of a part of the first data, compute a partial operation result;
    compute cumulative occurrence number sets of cumulative occurrence numbers, each cumulative occurrence number set being obtained by adding the occurrence number sets corresponding to the operations of the operation set, which, when applied to a same data value or equivalent data value of the possible data values of the part of the first data, provide one of the partial operation results having a same transformed result value resulting from an application of a second surjective function to the partial operation result; and
    analyzing the cumulative occurrence number sets to detect a data value of the part of the first data, wherein if the first data has leaked into the measure sets, the leakage of the first data is detected in the cumulative occurrence number sets which corresponds to the data value of the part of the first data.

13. The system according to claim 12, further comprising a measuring probe coupled to the measuring device and to the tested circuit for acquiring measures linked to an activity of the tested circuit.

14. The system according to claim 12, wherein the tested circuit is an emulator executing a tested application.

15. The system according to claim 12, further comprising a computing unit, the computing unit configured to select measures in each measure set, the counting of occurrence numbers being performed by the computing unit on the selected measures.

16. The system according to claim 12, further comprising a computing unit, the computing unit configured to:
    transmit, to the tested circuit, a plurality of distinct commands, each command triggering the execution by the tested circuit of one of the operations of the operation set applied to the first data; and
    collect, via the measuring device, the measures of one of the measure sets during the execution by the tested circuit of one of the operations of the operation set.

17. The system according to claim 12, wherein the measure sets include at least one of:
    measurements of current consumption of the tested circuit;
    measurements of electromagnetic radiation emitted by the tested circuit;
    measurements of absorption of magnetic field present around the tested circuit; or
    logic signals or digital data collected in the tested circuit.

18. The system according to claim 12, wherein each of the first and second surjective functions is at least one of the following functions:
    an identity function;
    a function providing a resultant value which is then reduced to a value corresponding to a Hamming weight;
    a function providing the Hamming weight of the value to which the function is applied, or
    a function providing a Hamming distance between a value and a preceding value to which the function is applied.

19. The system according to claim 12, further comprising a computing unit, the computing unit configured to reject the tested circuit or a program executed by the tested circuit if the analyzing determines the part of the first data.

20. The system according to claim 12, further comprising a computing unit, the computing unit configured to perform the operations of: computing an operation result for each possible data value of the part of the first data, computing the cumulative occurrence number sets, and analyzing the cumulative occurrence number sets, for a previously determined part of the first data and another part of the first data.

21. The system according to claim 12, wherein the operation of counting the occurrence numbers is performed on selected measures in each measure set, the selected measures in each measure set including at least one of:
    consecutive measures in the measure set;
    non-consecutive measures in the measure set;
    local extremum measures in the measure set; or
    all the measures in the measure set.

22. The system according to claim 12, wherein each operation of the operation set includes applying a single operation to the first data and to an input data of a set of input data, the single operation including at least one of the following operations:
    a symmetrical or asymmetrical encryption or decryption operation;
    a signature operation;
    a modular or non-modular multiplication operation with the first data;
    a logic Exclusive OR operation with the first data;
    a modular exponentiation operation, the first data being used as exponent;
    a modular reduction operation, the first data being used as modulus;
    a first substitution operation by a data selected in a first substitution table using the input data; or
    an operation combining a logic Exclusive OR operation with the first data and a second substitution operation replacing a result of the Exclusive OR operation with a data selected in a second substitution table using the result of the Exclusive OR operation.

23. The system according to claim 12, wherein the analyzing the cumulative occurrence number sets includes:

for each cumulative occurrence number, computing a normalized cumulative occurrence number by dividing the cumulative occurrence number by a corresponding number of occurrence numbers accumulated in the cumulative occurrence number;

for each possible data value of the part of the first data and each possible transformed result value of the partial operation results, computing a sum of squared differences between each normalized cumulative occurrence number corresponding to the possible data value of the part of the first data and the possible transformed result value of the partial result, and computing an average value of the cumulative occurrence numbers, divided by a number of operations in the operation set;

for each possible data value of the part of the first data, computing a cumulative total of difference sums corresponding to the possible transformed result values of the partial results; and comparing, with each other, the cumulative totals of difference sums, and detecting whether one of the cumulative totals of difference sums for one of the possible data values of the part of the first data is greater than other cumulative totals of difference sums.

24. The system according to claim 12, wherein the analyzing the cumulative occurrence number sets includes:

for each possible data value of the part of the first data and each possible transformed result value of the partial operation results, computing a cumulative total of the cumulative occurrence numbers of a corresponding cumulative occurrence number set;

for each cumulative occurrence number, computing a normalized cumulative number by dividing the cumulative occurrence number by the cumulative total of the cumulative occurrence number set, and computing a product of the normalized cumulative number by a logarithm of the normalized cumulative number;

for each possible data value of the part of the first data and each possible transformed result value of the partial operation result, computing a sum of the products corresponding to the possible data value of the part of the first data and the possible transformed result value of the partial operation results;

for each possible data value of the part of the first data, computing a cumulative total of the sums of products corresponding to the possible transformed result values of the partial operation results, each sum of product being multiplied by a corresponding number of the cumulative occurrence numbers; and comparing, with each other, the cumulative totals of the sums of products, and detecting whether one of the cumulative totals of the sums of products for one of the possible data values of the part of the first data is greater than the other cumulative totals of the sums of products.

25. A non-transitory computer-readable storage device carrying one or more sequences of instructions, which when executed by one or more processors, cause the one or more processors to:

acquire, via a measuring device, a plurality of measure sets, each measure set including measures of a physical quantity or logic signals acquired when a tested circuit executes an operation of an operation set of distinct cryptographic operations applied to a same first data stored by the tested circuit;

for each measure set, count occurrence numbers of transformed measure values resulting from a first surjective function applied to the measures of the measure set to form an occurrence number set for the measure set without including any time-related information, for each operation of the operation set, and each of possible data values of a part of the first data, compute a partial operation result;

compute cumulative occurrence number sets of cumulative occurrence numbers, each cumulative occurrence number set being obtained by adding the occurrence number sets corresponding to the operations of the operation set, which when applied to a same data value or equivalent data value of the possible data values of the part of the first data, provide one of the partial operation results having a same transformed result value resulting from an application of a second surjective function to the partial operation result; and analyzing the cumulative occurrence number sets to detect a data value of the part of the first data, wherein if the first data has leaked into the measure sets, the leakage of the first data is detected in the cumulative occurrence number sets which corresponds to the data value of the part of the first data.

\* \* \* \* \*

UNITED STATES PATENT AND TRADEMARK OFFICE
CERTIFICATE OF CORRECTION

PATENT NO. : 10,243,729 B2
APPLICATION NO. : 15/439530
DATED : March 26, 2019
INVENTOR(S) : Thiebeauld De La Crouee Page 1 of 1

It is certified that error appears in the above-identified patent and that said Letters Patent is hereby corrected as shown below:

On the Title Page

Column 2, Item (74), in "Attorney, Agent, or Firm", Line 1, delete "Bellerman" and insert -- Bellermann --, therefor.

In the Claims

In Column 28, Claim 18, Line 22, delete "applied," and insert -- applied; --, therefor.

Signed and Sealed this
Twenty-ninth Day of October, 2019

Andrei Iancu
*Director of the United States Patent and Trademark Office*